United States Patent
Kato et al.

(10) Patent No.: US 10,046,755 B2
(45) Date of Patent: Aug. 14, 2018

(54) HYBRID VEHICLE

(71) Applicant: Toyota Jidosha Kabushiki Kaisha, Toyota-shi, Aichi-ken (JP)

(72) Inventors: Shunya Kato, Seto (JP); Masaya Sugai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/583,151

(22) Filed: May 1, 2017

(65) Prior Publication Data
US 2017/0334424 A1 Nov. 23, 2017

(30) Foreign Application Priority Data

May 18, 2016 (JP) .................................. 2016-099383

(51) Int. Cl.
*B60W 20/10* (2016.01)
*B60W 10/06* (2006.01)
(Continued)

(52) U.S. Cl.
CPC ............. *B60W 20/10* (2013.01); *B60K 6/365* (2013.01); *B60K 6/445* (2013.01); *B60K 6/547* (2013.01);
(Continued)

(58) Field of Classification Search
CPC ...... B60W 20/10; B60W 20/11; B60W 10/06; B60W 10/08; B60W 30/182;
(Continued)

(56) References Cited

U.S. PATENT DOCUMENTS

| | | | |
|---|---|---|---|
| 5,941,795 A | 8/1999 | Tsuchiya et al. | |
| 6,123,642 A * | 9/2000 | Saito ..................... | B60K 6/48 477/3 |

(Continued)

FOREIGN PATENT DOCUMENTS

| | | | |
|---|---|---|---|
| EP | 2974930 A1 * | 1/2016 | ......... F02D 41/0205 |
| JP | H09273626 A | 10/1997 | |

(Continued)

OTHER PUBLICATIONS

Xia et al., "Ratio Control of CVT on Dynamic Characteristic," Year: 2010, vol. 3, pp. 546-549.*

(Continued)

*Primary Examiner* — Tuan C To
(74) *Attorney, Agent, or Firm* — Dinsmore & Shohl LLP

(57) ABSTRACT

When a kickdown switch is turned off, a target rotation speed of an engine is set on the basis of a vehicle speed and a gear and the engine, the first motor, and the second motor are controlled such that the smaller driving force of an upper-limit driving force based on the target rotation speed and a required driving force is output to a drive shaft and the engine rotates at the target rotation speed. On the other hand, when the kickdown switch is turned on, the target rotation speed is set to be higher than that when the kickdown switch is turned off on the basis of the vehicle speed and the gear and the engine, the first motor, and the second motor are controlled such that the required driving force is output to the drive shaft and the engine rotates at the target rotation speed.

6 Claims, 14 Drawing Sheets

(51) Int. Cl.
  *B60K 6/365*  (2007.10)
  *B60W 30/182* (2012.01)
  *B60W 30/188* (2012.01)
  *B60W 50/08*  (2012.01)
  *B60W 10/08*  (2006.01)
  *B60K 6/547*  (2007.10)
  *B60K 6/445*  (2007.10)
  *B60W 20/11*  (2016.01)

(52) U.S. Cl.
  CPC ............ *B60W 10/06* (2013.01); *B60W 10/08* (2013.01); *B60W 20/11* (2016.01); *B60W 30/182* (2013.01); *B60W 30/188* (2013.01); B60W 50/082 (2013.01); B60W 2510/1005 (2013.01); B60W 2520/10 (2013.01); B60W 2540/10 (2013.01); B60W 2540/103 (2013.01); B60W 2710/0644 (2013.01); B60W 2710/08 (2013.01); B60W 2710/1005 (2013.01); B60Y 2200/92 (2013.01); B60Y 2300/182 (2013.01); B60Y 2300/43 (2013.01); B60Y 2300/60 (2013.01); B60Y 2400/73 (2013.01); Y02T 10/7258 (2013.01); Y10S 903/91 (2013.01); Y10S 903/919 (2013.01); Y10S 903/93 (2013.01)

(58) Field of Classification Search
  CPC ............ B60W 30/188; B60W 50/082; B60W 2510/1005; B60W 2520/10; B60W 2540/10; B60W 2540/103; B60W 2710/0644; B60W 2710/08; B60W 2710/1005; B60Y 2200/92; B60Y 2300/182; B60Y 2300/43; B60Y 2300/60; B60Y 2400/73; Y02T 10/7258; Y10S 903/91; Y10S 903/919; Y10S 903/93; B60K 6/365; B60K 6/445; B60K 6/547
  See application file for complete search history.

(56) References Cited

U.S. PATENT DOCUMENTS

| | | | |
|---|---|---|---|
| 6,454,678 B1 | 9/2002 | Lee | |
| 8,744,653 B2* | 6/2014 | Hase | B60K 6/48 477/154 |
| 8,992,381 B1* | 3/2015 | Oda | B60W 10/06 477/115 |
| 9,802,615 B2* | 10/2017 | Fukada | B60W 30/182 |
| 9,919,701 B2* | 3/2018 | Kuroda | B60W 10/115 |
| 2008/0236912 A1* | 10/2008 | Ueoka | B60K 6/26 180/65.265 |
| 2012/0094801 A1* | 4/2012 | Hyodo | E02F 9/2246 477/111 |
| 2012/0100959 A1* | 4/2012 | Hyodo | E02F 9/20 477/111 |
| 2012/0101678 A1* | 4/2012 | Oyama | B60K 6/365 701/22 |
| 2013/0096761 A1* | 4/2013 | Kuroda | B60K 6/48 701/22 |
| 2014/0074334 A1* | 3/2014 | Tagawa | B60K 6/445 701/22 |
| 2016/0082826 A1* | 3/2016 | Aoki | B60K 6/445 180/65.23 |
| 2016/0153374 A1* | 6/2016 | Tashiro | F02D 41/10 701/103 |

FOREIGN PATENT DOCUMENTS

| | | | |
|---|---|---|---|
| JP | 2001-193828 A | | 7/2001 |
| JP | 2007-239504 A | | 9/2007 |
| JP | 2008-074328 A | | 4/2008 |
| JP | 2010-018256 A | | 1/2010 |
| JP | 2010012889 A | * | 1/2010 |
| JP | 2010038332 A | * | 2/2010 |
| JP | 2010210074 A | * | 9/2010 |
| JP | 2014-144659 A | | 8/2014 |
| JP | 2016-060319 A | | 4/2016 |

OTHER PUBLICATIONS

B. Fahimi, "A Switched Reluctance Machine Based Starter/Generator for More Electric Cars," Year: 2001, pp. 73-78.*

U.S. Appl. No. 15/450,196 filed Mar. 6, 2017 Inventors: Shunya Kato, Ikuo Ando, Naoki Ishikawa, Tooru Matsubara, Munehiro Katsumata, Masaya Sugai.

* cited by examiner

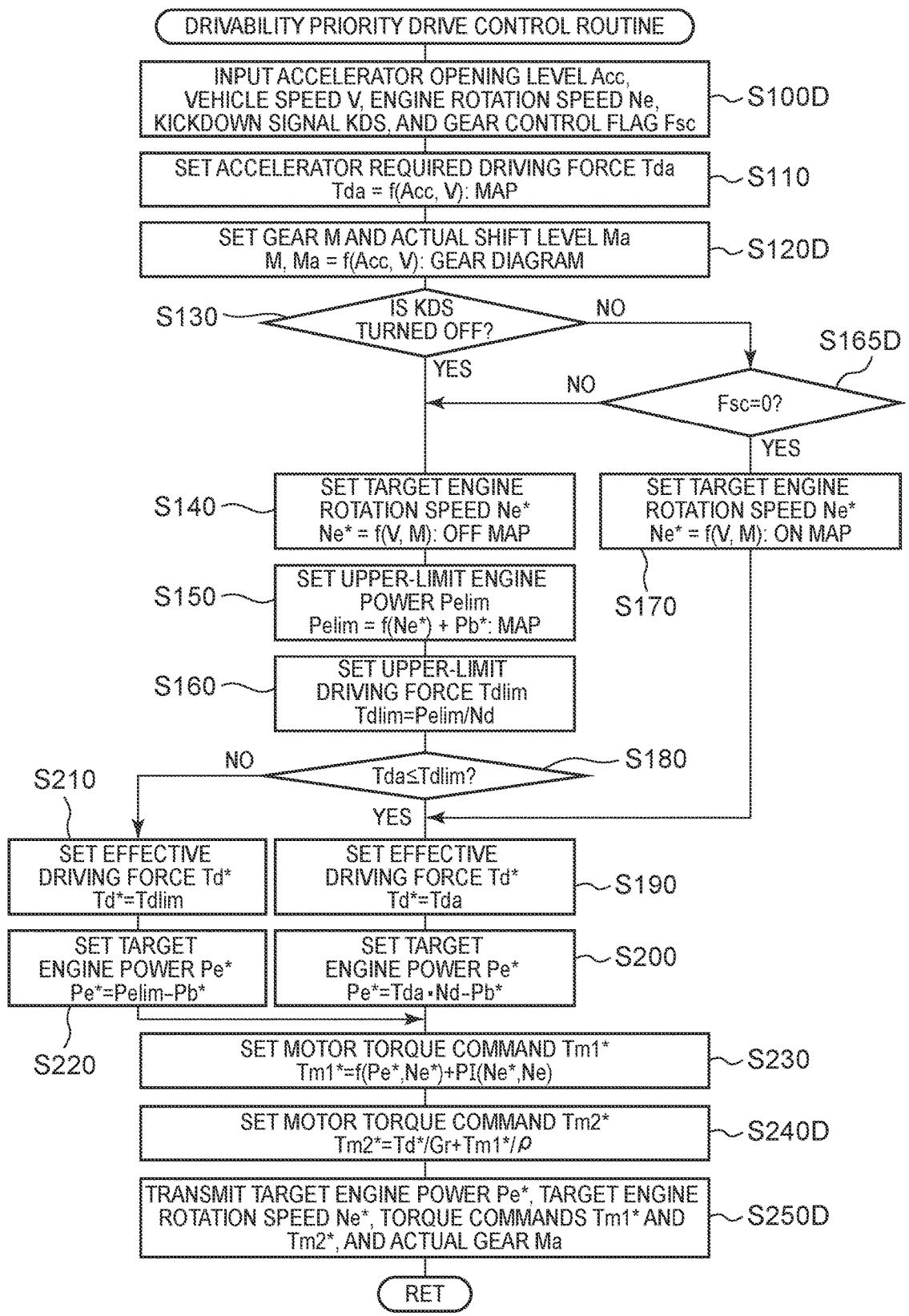

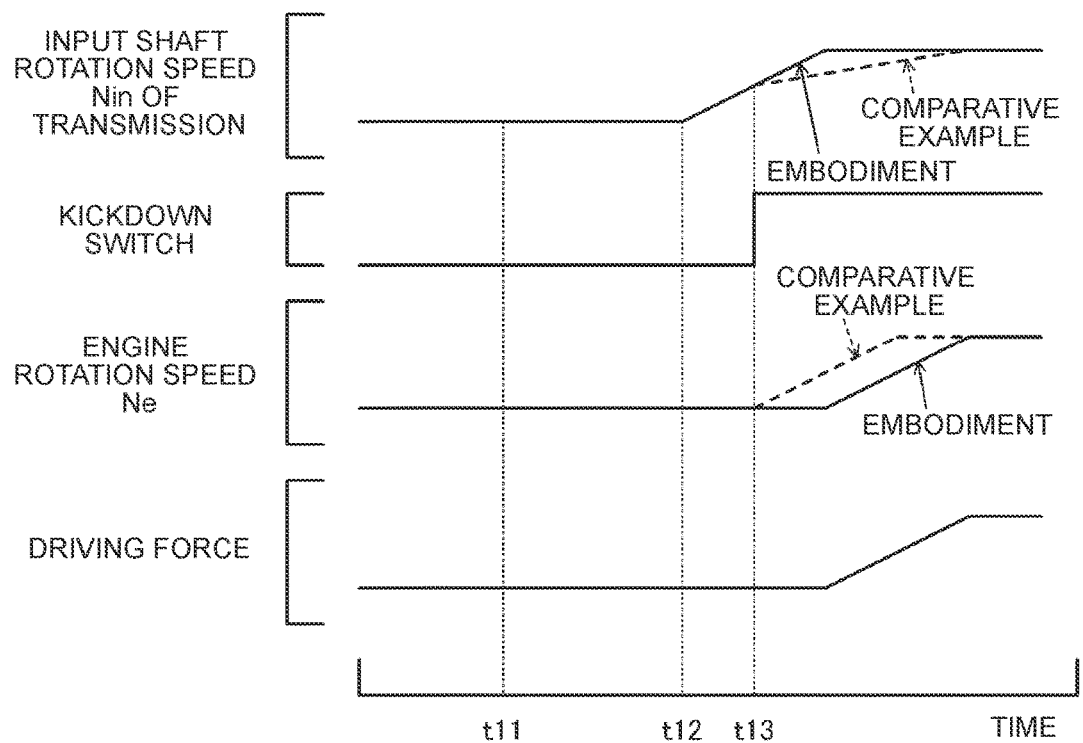
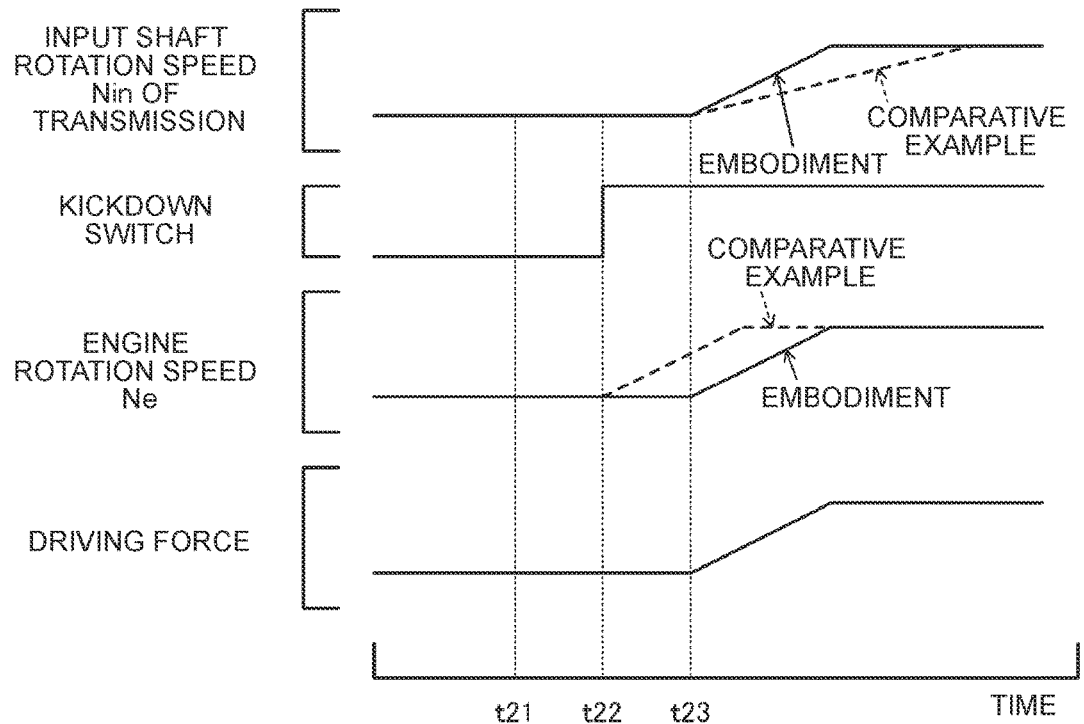

HYBRID VEHICLE

CROSS-REFERENCE TO RELATED APPLICATIONS

This application claims priority to Japanese Patent Application No. 2016-099383 filed on May 18, 2016, the entire contents of which are hereby incorporated by reference.

BACKGROUND

1. Technical Field

The disclosure relates to a hybrid vehicle.

2. Description of Related Art

In the related art, a hybrid vehicle in which a rotary element, which is connected to a second motor, of a planetary gear mechanism of which three rotary elements are connected to an engine, a first motor, and the second motor is connected to a drive shaft connected to vehicle wheels via a stepped transmission has been proposed (Japanese Patent Application Publication No. 2014-144659 (JP 2014-144659 A)). Driving of such a vehicle is basically controlled as follows. First, a required driving force is set on the basis of an amount of an accelerator operation by a driver and a vehicle speed, and the required driving force is multiplied by a rotation speed of the drive shaft to calculate a required power to be output from the engine. Then, a target rotation speed of the engine is set on the basis of the required power and an operation line of the engine in which fuel efficiency is optimal (a fuel efficiency optimal operation line). Then, the engine, the first motor, the second motor, and the stepped transmission are controlled such that the engine rotates at the target rotation speed to output the required power and the required driving force is output to the drive shaft for the hybrid vehicle to travel.

SUMMARY

In the above-mentioned hybrid vehicle, an operating point of the engine can be freely set regardless of a gear of the stepped transmission. Accordingly, a change in engine rotation speed may not match a change in vehicle speed. When a driver steps on an accelerator pedal, a power required for the engine increases and thus the engine rotation speed increases immediately but the vehicle speed does not increase rapidly. Accordingly, only the engine rotation speed increases rapidly before the vehicle speed increases. In general, a driver has a driving feeling that the engine rotation speed increases with an increase in vehicle speed. Accordingly, when only the engine rotation speed increases rapidly before the vehicle speed increases, the driver feels discomfort in terms of a driving feeling. Even when the stepped transmission shifts, the rotation speed of the engine may not change. When the driver steps on an accelerator pedal to increase the vehicle speed, the stepped transmission upshifts with the increase in vehicle speed. However, when the power required for the engine does not change between before and after the upshift, the engine operates without changing the engine rotation speed. In this case, since the driver generally has a feeling of a change in speed in which the rotation speed of the engine decreases due to the upshift of the stepped transmission as a driving feeling, the driver may feel discomfort due to not acquiring such a feeling of a change in speed. Such a problem is true when a virtual speed level shift is performed in a hybrid vehicle not including a stepped transmission. In consideration of the above-circumstances, it can be conceived that the rotation speed of the engine is set to a rotation speed based on the gear and the hybrid vehicle travels with a driving force based on the rotation speed. However, in a hybrid vehicle including a kickdown switch, when such control is uniformly performed regardless of whether the kickdown switch is turned on or off, a difference in a feeling of acceleration between when the kickdown switch is turned on and when the kickdown switch is turned off cannot be given to the driver.

The disclosure provides a hybrid vehicle that can give a better feeling of acceleration to a driver when a kickdown switch is turned on.

A hybrid vehicle according to an aspect of the disclosure includes: an engine; a first motor; a planetary gear mechanism, three rotary elements of the planetary gear connected to an output shaft of the engine, a rotary shaft of the first motor, and a drive shaft connected to an axle, respectively; a second motor configured to output a power to the drive shaft, and the second motor configured to receive a power from the drive shaft; an electronic control unit configured to set a required driving force to be output to the drive shaft based on an amount of an accelerator operation by a driver and a vehicle speed, and the electronic control unit configured to control the engine, the first motor, and the second motor such that the hybrid vehicle travels using a driving force based on the required driving force; and a kickdown switch configured to be turned on when the amount of the accelerator operation is equal to or larger than a predetermined value, and the kickdown switch configured to be turned off when the amount of the accelerator operation is smaller than the predetermined value. The electronic control unit is configured to i) when the kickdown switch is turned off, set a target rotation speed of the engine based on the vehicle speed and a shift gear, and control the engine, the first motor, and the second motor such that the smaller driving force of an upper-limit driving force and the required driving force is output to the drive shaft and the engine rotates at the target rotation speed, the upper-limit driving force being a driving force when the engine operates at the target rotation speed and an upper-limit power output from the engine is output to the drive shaft, and ii) when the kickdown switch is turned on, set the target rotation speed of the engine to be higher than when the kickdown switch is turned off based on the vehicle speed and the shift gear and, control the engine, the first motor, and the second motor such that the required driving force is output to the drive shaft or the smaller driving force of the upper limit driving force and the required driving force is output to the drive shaft, and the engine rotates at the target rotation speed.

In the hybrid vehicle according to the aspect, when the kickdown switch is turned off, the target rotation speed of the engine is set on the basis of the vehicle speed and the gear and the engine, the first motor, and the second motor are controlled such that the smaller driving force of the upper-limit driving force which is a driving force when the engine operates at the target rotation speed and the upper-limit power output from the engine is output to the drive shaft and the required driving force is output to the drive shaft and the engine rotates at the target rotation speed. Accordingly, when the driver steps on the accelerator pedal, it is possible to set the engine rotation speed to the rotation speed (the target rotation speed) based on the vehicle speed and the gear and to prevent the driver from feeling discomfort in terms of a driving feeling in comparison with a case in which the engine rotation speed increases rapidly before the vehicle speed increases. When the gear is changed (shifted), it is thus possible to give a feeling of a change in speed to the driver. As a result, it is possible to give a better driving feeling to the driver. On the other hand, when the kickdown switch is turned on, the target rotation speed is set to be higher than when the kickdown switch is turned off on the basis of the vehicle speed and the gear and the engine, the first motor, and the second motor are controlled such that the required driving force is output to the drive shaft or the smaller driving force of the upper-limit driving force and the required driving force is output to the drive shaft and the engine rotates at the target rotation speed. Accordingly, similarly to when the kickdown switch is turned off, it is possible to give a better driving feeling to the driver. In comparison with a case in which the kickdown switch is turned off, it is possible to set the engine rotation speed (the target rotation speed) to be higher and to output a larger driving force to the drive shaft by increasing the required driving force based on the amount of the accelerator operation and increasing the upper-limit power and the upper-limit driving force based on the target rotation speed. Accordingly, it is possible to give a better feeling of acceleration to the driver when the kickdown switch is turned on.

In the hybrid vehicle according to the aspect, the electronic control unit may be configured to set the gear based on the amount of the accelerator operation and the vehicle speed or based on the driver's shifting operation. According to this configuration, the gear can be set on the basis of the amount of the accelerator operation and the vehicle speed (by an automatic change in gear) or the gear can be set on the basis of the driver's shifting operation.

In the hybrid vehicle according to the aspect, the gear may be a virtual gear. The hybrid vehicle may further include a stepped transmission attached between the drive shaft and the planetary gear mechanism, and the gear may be a gear of the stepped transmission or a gear obtained by adding a virtual gear to the gear of the stepped transmission. Here, the "gear obtained by adding a virtual gear to the gear of the stepped transmission" indicates that the gears of the stepped transmission and the virtual gears are combined to achieve a total of four gears by adding the virtual gears in two steps to the gears of the stepped transmission in two steps or to achieve a total of six gears by adding the virtual gears in two steps to the gears of the stepped transmission in three steps. Accordingly, it is possible to utilize a desired number of gears.

In the hybrid vehicle according to the aspect including the stepped transmission, the electronic control unit may be configured to switch the target rotation speed from an OFF rotation speed when the kickdown switch is turned off to an ON rotation speed when the kickdown switch is turned on after gear control is completed in a case where the kickdown switch is turned on while the gear control of the stepped transmission is being performed. When the target rotation speed is switched from the OFF rotation speed to the ON rotation speed in the middle of the gear control, particularly, in the middle of inertia phase control of changing a rotation speed of the input shaft of the stepped transmission to a rotation speed corresponding to the shifted level, shock may be generated in the middle of the gear control or a time to completion of the gear control may be extended with the rapid increase in the engine rotation speed. On the contrary, when the kickdown switch is turned on in the middle of the gear control, it is possible to prevent shock in the middle of the gear control or extension of the time to completion of the gear control by switching the target rotation speed from the OFF rotation speed to the ON rotation speed after the gear control is completed.

In this case, the electronic control unit may be configured to switch the target rotation speed from the OFF rotation speed to the ON rotation speed at the start time of inertia phase control to change a rotation speed of an input shaft of the stepped transmission to a rotation speed corresponding to a changed gear in a case where the kickdown switch is turned on before the inertia phase control is started in the gear control of the stepped transmission. According to this configuration, in comparison with a case in which the target rotation speed is switched from the OFF rotation speed to the ON rotation speed immediately when the kickdown switch is turned on, it is possible to prevent shock in the middle of the gear control or extension of the time to completion of the gear control. In comparison with a case in which the target rotation speed is switched from the OFF rotation speed to the ON rotation speed after the gear control is completed, it is possible to switch the target rotation speed at an earlier timing. By experiment or the like of the inventors, it was seen that extension of the time to completion of the gear control can be prevented by switching the target rotation speed when the inertia phase control is started.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 15 is a flowchart illustrating an example of a drivability priority drive control routine which is performed by the HVECU when a D position is set in a driving feeling priority mode in the second embodiment;

FIG. 16 is a diagram illustrating an example of a state in which a kickdown switch is turned on in the middle of gear control of a gearshift in the second embodiment;

FIG. 17 is a diagram illustrating an example of a state in which the kickdown switch is turned on before inertia phase control is started in the middle of gear control of a gearshift in the second embodiment.

DETAILED DESCRIPTION OF EMBODIMENTS

Embodiments of the disclosure will be described below with reference to the accompanying drawings.

Figure 1:
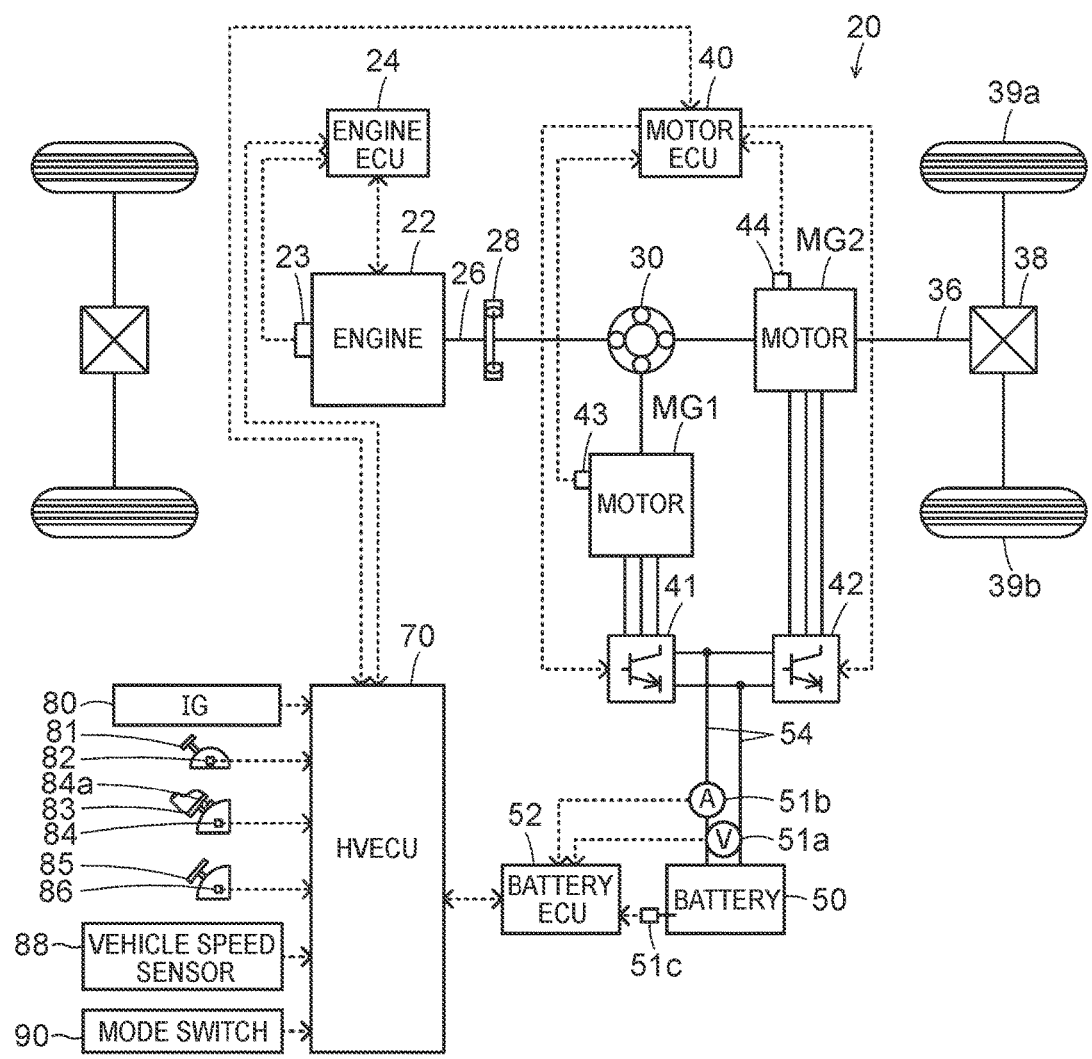
FIG. 1 is a diagram schematically illustrating a configuration of a hybrid vehicle according to a first embodiment of the disclosure.

FIG. 1 is a diagram schematically illustrating a configuration of a hybrid vehicle 20 according to a first embodiment of the disclosure. As illustrated in the drawing, the hybrid vehicle 20 according to the first embodiment includes an engine 22, a planetary gear 30, motors MG1 and MG2, inverters 41 and 42, a battery 50, and a hybrid electronic control unit (hereinafter referred to as an "HVECU") 70.

The engine 22 is constituted by an internal combustion engine that outputs power using gasoline, diesel, or the like as fuel. Operation of the engine 22 is controlled by an engine electronic control unit (hereinafter referred to as an "engine ECU") 24.

Although not illustrated in the drawing, the engine ECU 24 is constituted by a microprocessor centered on a CPU and includes a ROM that stores a processing program, a RAM that temporarily stores data, input and output ports, and a communication port in addition to the CPU. Signals from various sensors required for controlling the operation of the engine 22 are input to the engine ECU 24 via the input port. Examples of the signals input to the engine ECU 24 include a crank angle θcr from a crank position sensor 23 that detects a rotational position of a crank shaft 26 of the engine 22, and a throttle opening level TH from a throttle valve position sensor that detects a position of a throttle valve. Various control signals for controlling the driving of the engine 22 are output from the engine ECU 24 via the output port. Examples of the signals output from the engine ECU 24 include a drive control signal to a throttle motor that adjusts the position of the throttle valve, a drive control signal to a fuel injection valve, and a drive control signal to an ignition coil integrated with an igniter. The engine ECU 24 is connected to the HVECU 70 via the communication port, controls driving of the engine 22 using a control signal from the HVECU 70, and outputs data on an operating state of the engine 22 to the HVECU 70 if necessary. The engine ECU 24 calculates a rotation speed of the crank shaft 26, that is, a rotation speed Ne of the engine 22, on the basis of a crank angle θcr from the crank position sensor 23.

The planetary gear 30 is constituted by a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via a damper 28.

The motor MG1 is constituted, for example, by a synchronous generator-motor and the rotor thereof is connected to the sun gear of the planetary gear 30 as described above. The motor MG2 is constituted, for example, by a synchronous generator-motor and the rotor thereof is connected to the drive shaft 36. The inverters 41 and 42 are connected to the battery 50 via power lines 54. The motors MG1 and MG2 are rotationally driven by controlling switching of a plurality of switching elements, which are not illustrated, of the inverters 41 and 42 by a motor electronic control unit (hereinafter referred to as a "motor ECU") 40.

Although not illustrated in the drawing, the motor ECU 40 is constituted by a microprocessor centered on a CPU and includes a ROM that stores a processing program, a RAM that temporarily stores data, input and output ports, and a communication port in addition to the CPU. Signals from various sensors required for controlling driving of the motors MG1 and MG2 are input to the motor ECU 40 via the input port. Examples of the signals input to the motor ECU 40 include rotational positions θm1 and θm2 from rotational position sensors 43 and 44 that detect rotational positions of the rotors of the motors MG1 and MG2 and phase currents from current sensors that detect currents flowing in phases of the motors MG1 and MG2. Switching control signals to switching elements, which are not illustrated, of the inverters 41 and 42 are output from the motor ECU 40 via the output port. The motor ECU 40 is connected to the HVECU 70 via the communication port, controls driving of the motors MG1 and MG2 using a control signal from the HVECU 70, and outputs data on driving states of the motors MG1 and MG2 to the HVECU 70 if necessary. The motor ECU 40 calculates the rotation speeds Nm1 and Nm2 of the motors MG1 and MG2 on the basis of the rotational positions θm1 and θm2 of the rotors of the motors MG1 and MG2 from the rotational position sensors 43 and 44.

The battery 50 is constituted, for example, by a lithium ion secondary battery or a nickel hydride secondary battery and is connected to the inverters 41 and 42 via the power lines 54. The battery 50 is managed by a battery electronic control unit (hereinafter referred to as a "battery ECU") 52.

Although not illustrated in the drawing, the battery ECU 52 is constituted by a microprocessor centered on a CPU and includes a ROM that stores a processing program, a RAM that temporarily stores data, input and output ports, and a communication port in addition to the CPU. Signals from various sensors required for managing the battery 50 are input to the battery ECU 52 via the input port. Examples of the signals input to the battery ECU 52 include a battery voltage Vb from a voltage sensor 51a disposed between terminals of the battery 50, a battery current Ib from a current sensor 51b attached to an output terminal of the battery 50, and a battery temperature Tb from a temperature sensor 51c attached to the battery 50. The battery ECU 52 is connected to the HVECU 70 via the communication port and outputs data on a state of the battery 50 to the HVECU 70 if necessary. The battery ECU 52 calculates a power storage ratio SOC on the basis of an integrated value of the battery current Ib from the current sensor 51b. The power storage ratio SOC is a ratio of a capacity of dischargeable power of the battery 50 to a full capacity of the battery 50. The battery ECU 52 calculates an output limit Wout of the battery 50 on the basis of the battery temperature Tb from the temperature sensor 51c and the power storage ratio SOC. The output limit Wout is a maximum allowable power which can be discharged from the battery 50.

Although not illustrated in the drawing, the HVECU 70 is constituted by a microprocessor centered on a CPU and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80, a shift position SP from a shift position sensor 82 that detects an operating position of a shift lever 81, an accelerator opening level Acc from an accelerator pedal position sensor 84 that detects a degree of stepping on an accelerator pedal 83, a kickdown signal KDS from a kickdown switch 84a, and a brake pedal position BP from a brake pedal position sensor 86 that detects a degree of stepping on a brake pedal 85. The position of the kickdown switch 84a is adjusted such that it comes in contact with the accelerator pedal 83 when the degree of stepping on the accelerator pedal 83 reaches a predetermined proportion (for example, 75%, 80%, or 85%) of the entire degree. The kickdown switch 84a is turned on when coming in contact with the accelerator pedal 83 (when the degree of stepping on the accelerator pedal 83 is equal to or greater than the predetermined proportion), and is turned off when being separated from the accelerator pedal 83 (when the degree of stepping on the accelerator pedal 83 is less than the predetermined proportion). A spring which is not illustrated is attached to the kickdown switch 84a such that a feeling of stepping on the accelerator pedal (a feeling of stepping) after the accelerator pedal 83 comes in contact with the kickdown switch 84a becomes heavy. Examples of the input signals also include a vehicle speed V from a vehicle speed sensor 88 and a mode switching control signal from a mode switch 90. As described above, the HVECU 70 is connected to the engine ECU 24, the motor ECU 40, and the battery ECU 52 via the communication port and gives and takes various control signals or data to and from the engine ECU 24, the motor ECU 40, and the battery ECU 52.

Examples of the shift position SP include a parking position (P position), a reversing position (R position), a neutral position (N position), a driving position (D position), and a manual position (M position). The manual position (M position) is provided with an upshift position (+ position) and a downshift position (− position). When the shift position SP is changed to the manual position (M position), driving of the engine 2 is controlled such that it is connected to the drive shaft 36 via an automatic gearshift of six virtual gears. The mode switch 90 is a switch which is used to select driving modes including a driving feeling priority mode in which fuel efficiency is slightly decreased but a driver's driving feeling (drivability or driving feeling) has priority and a normal driving mode in which fuel efficiency has priority. When the normal driving mode is selected and the shift position SP is the driving position (D position), driving of the engine 22 and the motors MG1 and MG2 are controlled such that static inertia and fuel efficiency are compatible with each other. When the driving feeling priority mode is selected and the shift position SP is the driving position (D position), driving of the engine 22 is controlled such that the engine is connected to the drive shaft 36 via the automatic gearshift of six virtual gears.

The hybrid vehicle 20 according to the first embodiment having the above-mentioned configuration travels in any one of a plurality of driving modes including a hybrid driving (HV driving) mode and an electrical driving (EV driving) mode. Here, the HV driving mode is a mode in which the vehicle travels using power from the engine 22 and power from the motors MG1 and MG2 while operating the engine 22. The EV driving mode is a mode in which the vehicle travels using power from the motor MG2 without operating the engine 22.

Figure 2:
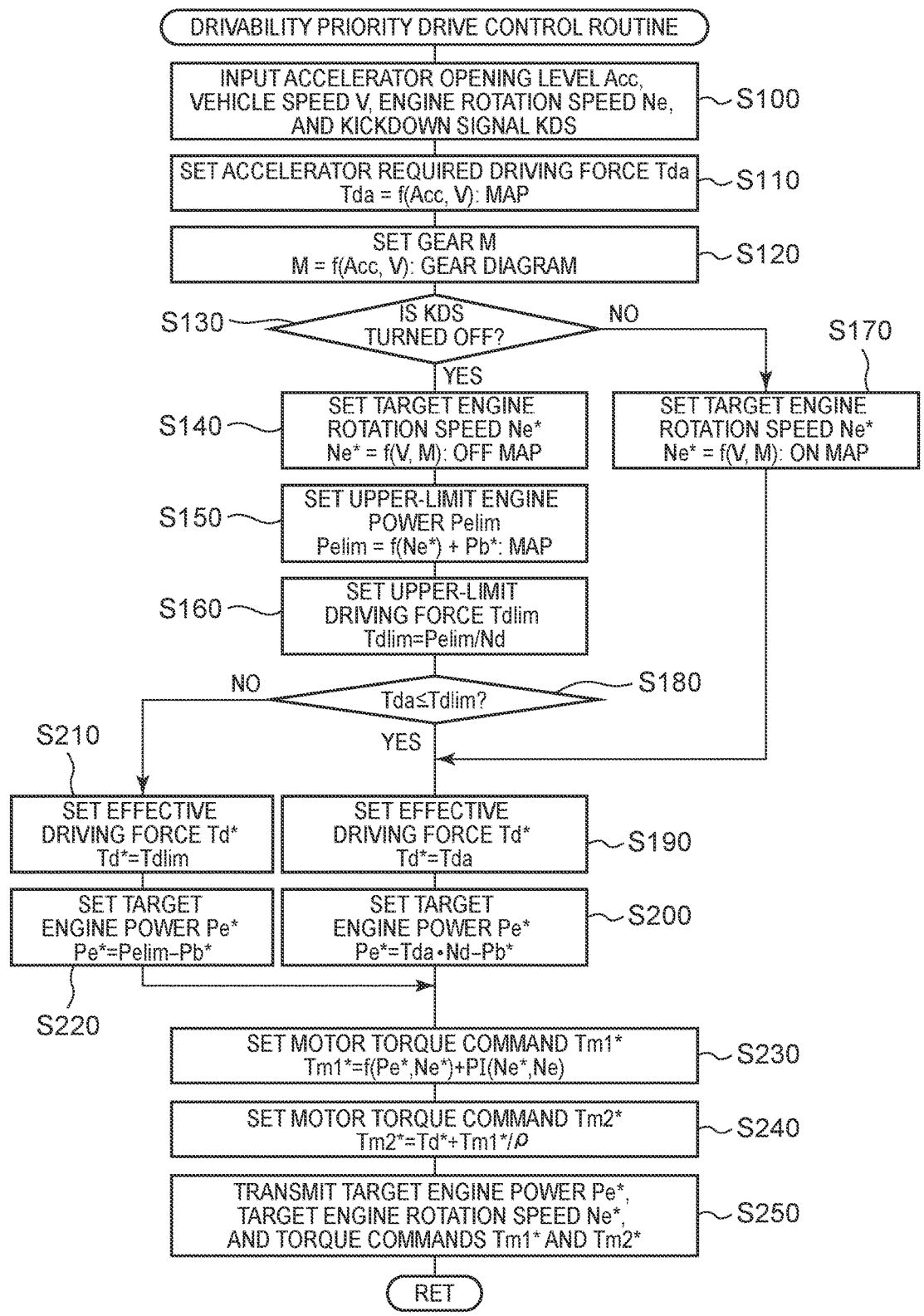
FIG. 2 is a flowchart illustrating an example of a drivability priority drive control routine which is performed by an HVECU when a D position is set in a driving feeling priority mode.

The operation of the hybrid vehicle 20 having the above-mentioned configuration, particularly, the operation when a driving feeling priority mode is selected by the mode switch 90, will be described below. FIG. 2 is a flowchart illustrating an example of a drivability priority drive control routine which is performed by the HVECU 70 when the driving feeling priority mode is selected and the shift position SP upshifts to the driving position (D position). This routine is repeatedly performed at predetermined times (for example, every several msec). Before describing drive control when the D position is set in the driving feeling priority mode using the drivability priority drive control routine illustrated in FIG. 2, drive control when the D position is set in the driving feeling priority mode (drive control in the HV driving mode) will be first described for the purpose of convenience of explanation.

Figure 4:
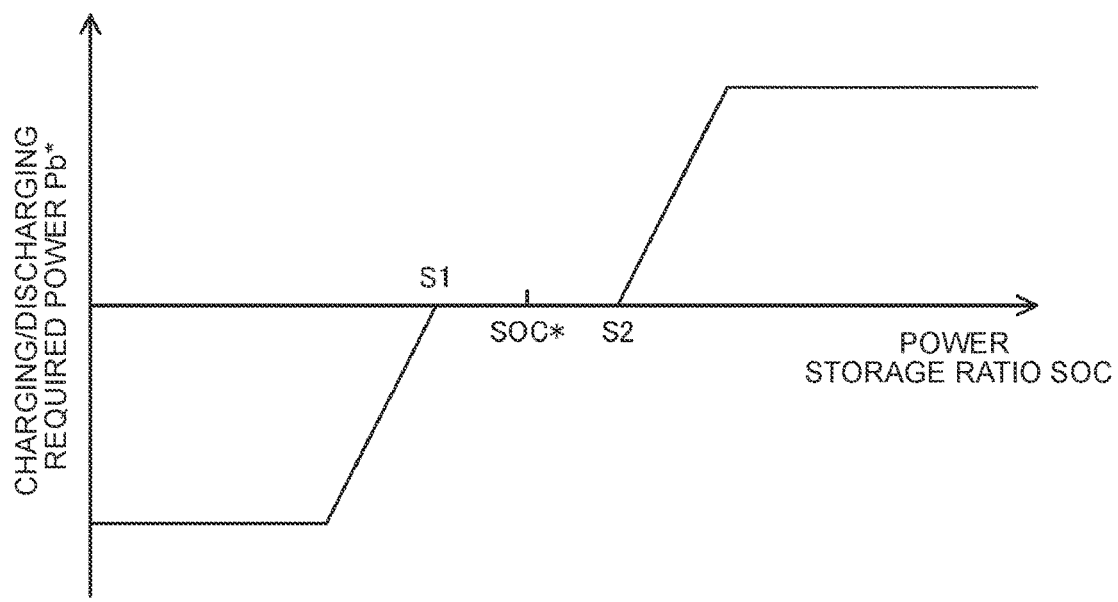
FIG. 4 is a diagram illustrating an example of a charging/discharging required power setting map.

In the normal driving mode, when the vehicle travels in the HV driving mode, drive control is performed as follows by the HVECU 70. The HVECU 70 first calculates an accelerator required driving force Tda which is required for traveling (required for the drive shaft 36) on the basis of the accelerator opening level Acc and the vehicle speed V and sets the accelerator required driving force Tda as an effective driving force Td*. The accelerator required driving force Tda can be calculated, for example, from an accelerator required driving force setting map illustrated in FIG. 4. Subsequently, the set effective driving force Td* is multiplied by a rotation speed Nd of the drive shaft 36 to calculate a driving required power Pedrv required for traveling. Here, a rotation speed obtained by multiplying the rotation speed Nm2 of the motor MG2 by a conversion factor km, a rotation speed obtained by multiplying the vehicle speed V by a conversion factor kv, or the like can be used as the rotation speed Nd of the drive shaft 36. A charging/discharging required power Pb* (which has a positive value when power is discharged from the battery 50) of the battery 50 is set such that the power storage ratio SOC of the battery 50 approaches a target ratio SOC*, and a target engine power Pe* is calculated by subtracting the charging/discharging required power Pb* of the battery 50 from the driving required power Pedrv as expressed by Expression (1). The charging/discharging required power Pb* is set, for example, using a charging/discharging required power setting map illustrated in FIG. 4. In the charging/discharging required power setting map, a dead zone from a value S1 to a value S2 with respect to the target ratio SOC* is provided and the charging/discharging required power Pb* is set as discharging power (power with a positive value) when the power storage ratio SOC is greater than the upper limit value S2 of the dead zone, and is set as charging power (power with a negative value) when the power storage ratio SOC is less than the lower limit value S1 of the dead zone.

$$Pe^* = Pedrv - Pb^* \qquad (1)$$

Figure 5:
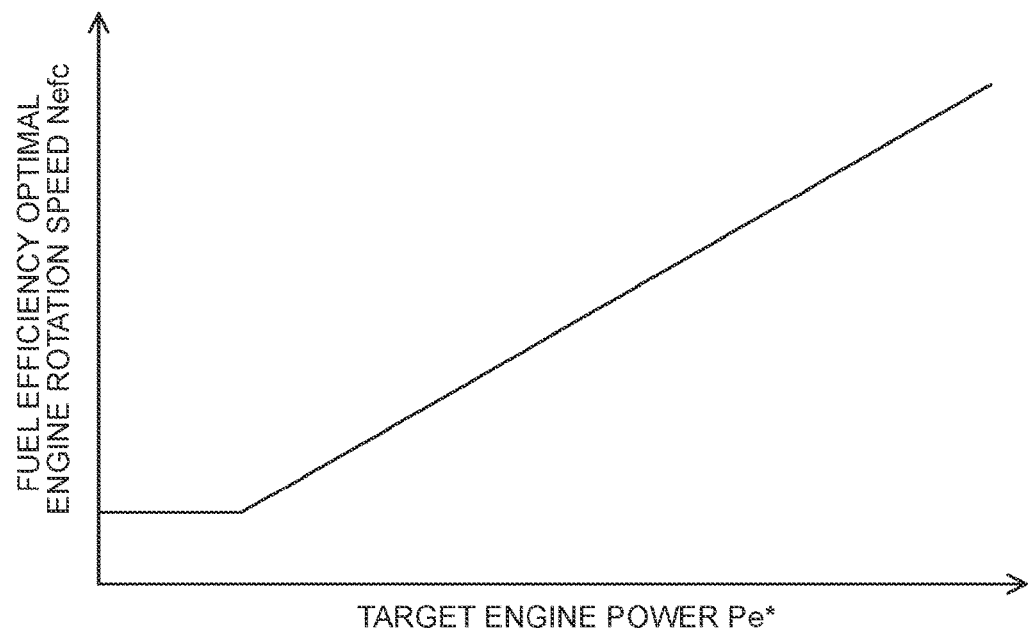
FIG. 5 is a diagram illustrating an example of a fuel efficiency optimal engine rotation speed setting map.

Then, a fuel efficiency optimal engine rotation speed Nefc is calculated using the target engine power Pe* and a fuel efficiency optimal engine rotation speed setting map, and the fuel efficiency optimal engine rotation speed Nefc is set as the target engine rotation speed Ne*. An example of the fuel efficiency optimal engine rotation speed setting map is illustrated in FIG. 5. The fuel efficiency optimal engine rotation speed setting map is determined as a relationship between the target engine power Pe* and the rotation speed at which the engine 22 can efficiently operate by experiment or the like. Since the fuel efficiency optimal engine rotation speed Nefc basically increases as the target engine power Pe* increases, the target engine rotation speed Ne* also increases as the target engine power Pe* increases. Subsequently, as expressed by Expression (2), a torque command Tm1* of the motor MG1 is calculated using the rotation speed Ne of the engine 22, the target engine rotation speed Ne*, the target engine power Pe*, and a gear ratio ρ of the planetary gear 30 (the number of teeth of the sun gear/the number of teeth of the ring gear). Expression (2) is a relational expression of rotation speed feedback control for causing the engine 22 to rotate at the target engine rotation speed Ne*. In Expression (2), the first term on the right side is a feedforward term, and the second and third terms on the right side are a proportional term and an integral term of a feedback term. The first term on the right side denotes a torque which is used for the motor MG1 to receive a torque output from the engine 22 and applied to the rotary shaft of the motor MG1 via the planetary gear 30. "kp" of the second term on the right side denotes a gain of the proportional term, and "ki" of the third term on the right side denotes a gain of the integral term. Considering a case in which the engine 22 is in a substantially static state (when the target engine rotation speed Ne* and the target engine power Pe* are substantially constant), it can be seen that as the target engine power Pe* increases, the first term on the right side of Expression (2) decreases (the absolute value thereof increases), the torque command Tm1* of the motor MG1 decreases (increases to the negative side), and a power of the motor MG1 (which has a positive value when power is consumed) obtained by multiplying the torque command Tm1* of the motor MG1 by the rotation speed Nm1 decreases (generated power increases).

$$Tm1^* = -(Pe^*/Ne^*) \cdot [\rho/(1+\rho)] + kp \cdot (Ne^* - Ne) + ki \cdot \int (Ne^* - Ne)dt \quad (2)$$

Then, as expressed by Expression (3), a torque command Tm2* of the motor MG2 is set by subtracting a torque (−Tm1*/ρ) output from the motor MG1 and applied to the drive shaft 36 via the planetary gear 30 when the motor MG1 is driven in accordance with the torque command Tm1* from the effective driving force Td*. The torque command Tm2* of the motor MG2 is limited to a torque limit Tm2max obtained from the output limit Wout of the battery 50 using Expression (4). As expressed by Expression (4), the torque limit Tm2max is obtained by subtracting the power of the motor MG1, which is obtained by multiplying the torque command Tm1* of the motor MG1 by the rotation speed Nm1, from the output limit Wout of the battery 50 and dividing the resultant value by the rotation speed Nm2 of the motor MG2.

$$Tm2^* = Td^* + Tm1^*/\rho \quad (3)$$

$$Tm2\text{max} = (Wout - Tm1^* Nm1)Nm2 \quad (4)$$

When the target engine power Pe*, the target engine rotation speed Ne*, and the torque commands Tm1* and Tm2* of the motors MG1 and MG2 are set in this way, the target engine power Pe* and the target engine rotation speed Ne* are transmitted to the engine ECU 24 and the torque commands Tm1* and Tm2* of the motors MG1 and MG2 are transmitted to the motor ECU 40.

When the target engine power Pe* and the target engine rotation speed Ne* are received, the engine ECU 24 performs intake air volume control, fuel injection control, ignition control, and the like of the engine 22 such that the engine 22 operates on the basis of received target engine power Pe* and the received target engine rotation speed Ne*. When the torque commands Tm1* and Tm2* of the motors MG1 and MG2 are received, the motor ECU 40 performs switching control of a plurality of switching elements of the inverters 41 and 42 such that the motors MG1 and MG2 are driven with the torque commands Tm1* and Tm2*.

When the target engine power Pe* is less than a threshold value Pref in the HV driving mode, it is determined that a stop condition of the engine 22 is satisfied and the operation of the engine 22 stops to transition to the EV driving mode.

In the EV driving mode, the HVECU 70 sets the effective driving force Td* in the same way as in the HV driving mode, sets the torque command Tm1* of the motor MG1 to a value of 0, and sets the torque command Tm2* of the motor MG2 in the same way as in the HV driving mode. The torque commands Tm1* and Tm2* of the motors MG1 and MG2 are transmitted to the motor ECU 40. Then, the motor ECU 40 performs switching control of a plurality of switching elements of the inverters 41 and 42 as described above.

In the EV driving mode, when the target engine power Pe* calculated in the same way as in the HV driving mode is equal to or greater than the threshold value Pref, it is determined that a start condition of the engine 22 is satisfied and the engine 22 starts to transition to the HV driving mode.

Drive control when the D position is set in the driving feeling priority mode will be described below with reference to the drivability priority drive control routine illustrated in FIG. 2. When the drivability priority drive control routine is performed, the HVECU 70 receives the accelerator opening level Acc from the accelerator pedal position sensor 84, the kickdown signal KDS from the kickdown switch 84a, the vehicle speed V from the vehicle speed sensor 88, and the rotation speed Ne of the engine 22 (Step S100). Here, as the rotation speed Ne of the engine 22, a value calculated on the basis of the crank angle θcr from the crank position sensor 23 can be received from the engine ECU 24 by communication.

Figure 6:
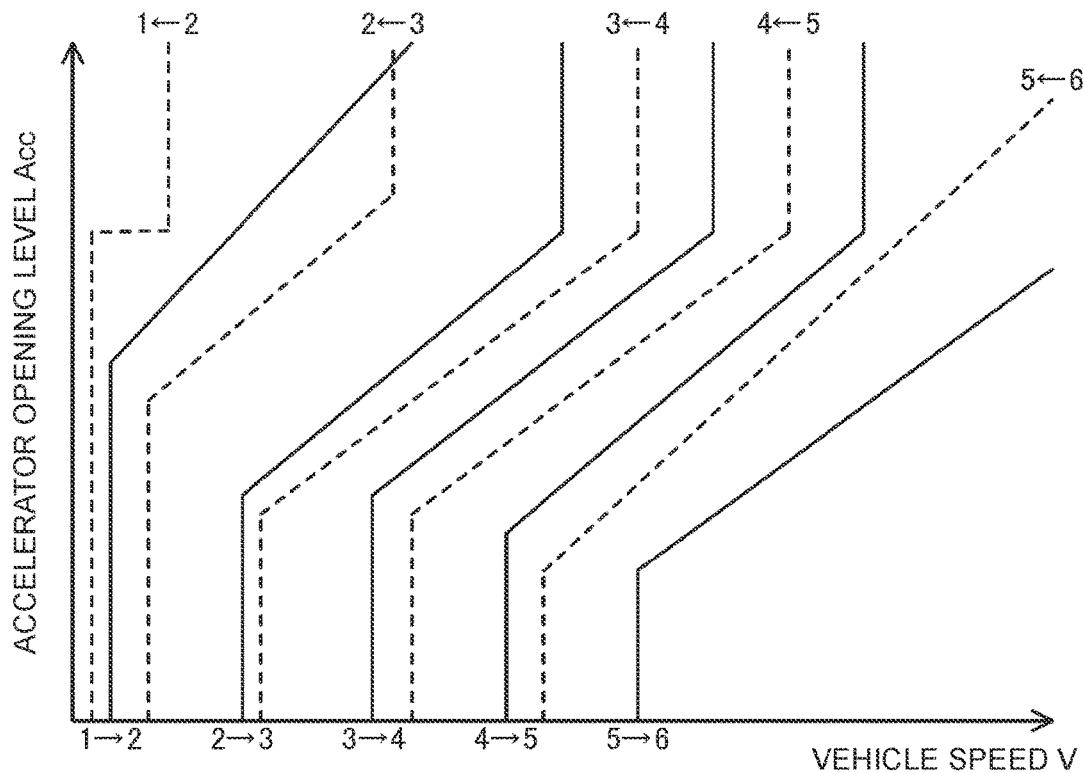
FIG. 6 is a diagram illustrating an example of a gear diagram.

Subsequently, an accelerator required driving force Tda is set using the accelerator opening level Acc, the vehicle speed V, and an accelerator required driving force setting map illustrated in FIG. 3 (Step S110) and the gear M is set using the accelerator opening level Acc, the vehicle speed V, and the gear diagram (Step S120). FIG. 6 illustrates an example of the gear diagram. In the drawing, solid lines denote upshift lines, and dotted lines denote downshift lines. In the first embodiment, since control is performed with an automatic transmission of six virtual gears, the gear diagram also corresponds to six gears.

Figure 7:
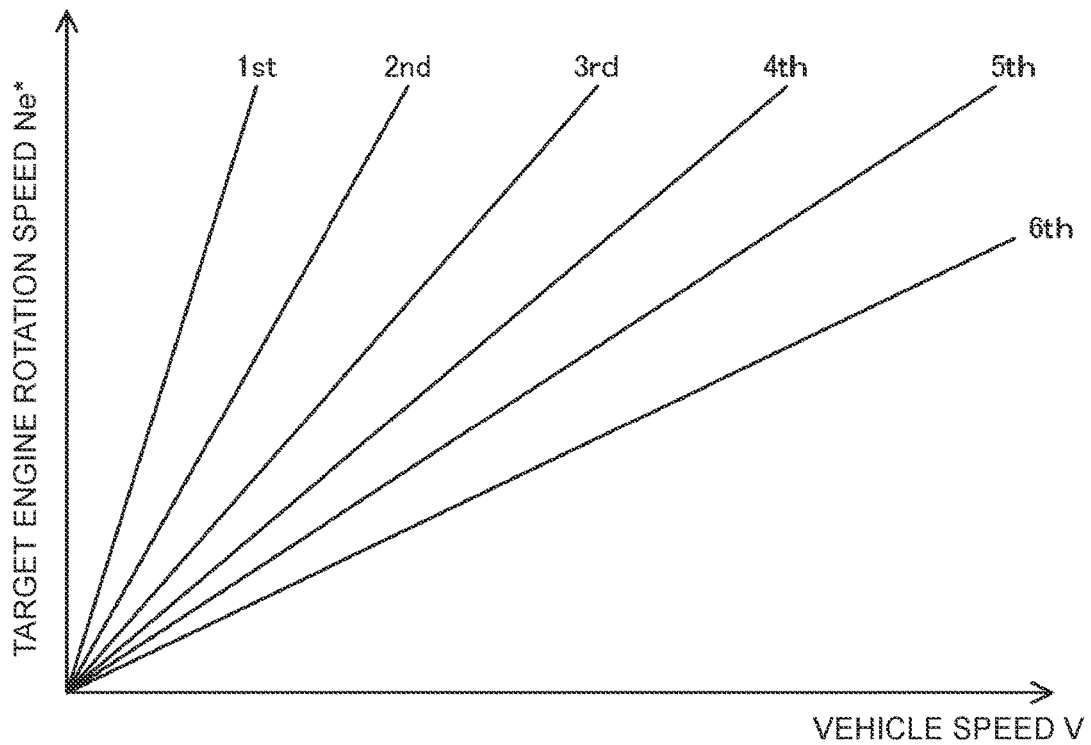
FIG. 7 is a diagram illustrating an example of a first target engine rotation speed setting map.

Then, it is determined whether the kickdown switch 84a is turned on or off using the kickdown signal KDS (Step S130). Then, when the kickdown switch 84a is turned off, a target engine rotation speed Ne* is set using the vehicle speed V, the gear M, and a first target engine rotation speed setting map (Step S140). FIG. 7 illustrates an example of the first target engine rotation speed setting map. As illustrated in the drawing, when the kickdown switch 84a is turned off, the target engine rotation speed Ne* is set in a linear relationship with the vehicle speed V for each gear such that a slope with respect to the vehicle speed V decreases as the gear increases. By setting the target engine rotation speed Ne* in this way (by causing the engine 22 to rotate at the target engine rotation speed Ne*), it is possible to give a driving feeling of a vehicle equipped with an automatic transmission to a driver by increasing the rotation speed Ne of the engine 22 with an increase in the vehicle speed V for each gear, or decreasing the rotation speed Ne of the engine 22 in upshifting and increasing the rotation speed Ne of the engine 22 in downshifting.

Figure 8:
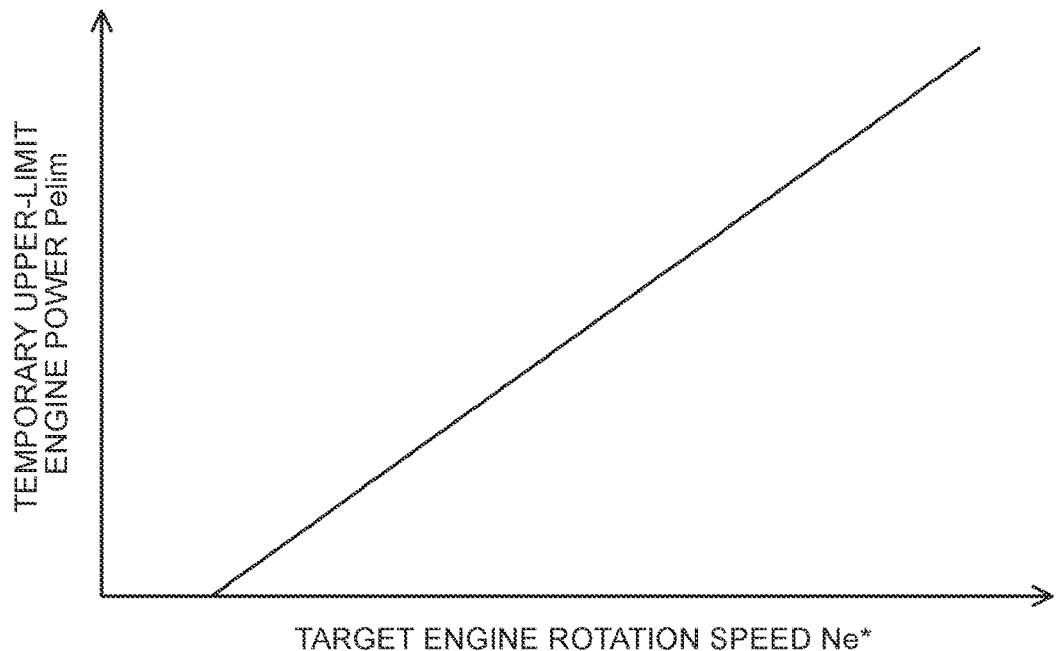
FIG. 8 is a diagram illustrating an example of an upper-limit engine power setting map.

Then, an upper-limit engine power Pelim is set by adding a charging/discharging required power Pb* to a temporary upper-limit engine power Pelim which is obtained using the target engine rotation speed Ne* and an upper-limit engine power setting map (Step S150). Here, the upper-limit engine power Pelim is a maximum power which is output from the engine 22 when the engine 22 operates at the target engine rotation speed Ne*. FIG. 8 illustrates an example of the upper-limit engine power setting map. As illustrated in the drawing, the temporary upper-limit engine power Pelim is set to increase as the target engine rotation speed Ne* increases. The reason for addition of the charging/discharging required power Pb* to the upper-limit engine power Pelim is not to change the power to be output from the engine 22 even when the battery 50 is charged or discharged. This will be described later. When the power storage ratio SOC is in a dead zone (a range from a value S1 to a value S2 in FIG. 4) centered on a target ratio SOC*, the charging/discharging required power Pb* is set to 0 and thus the temporary upper-limit engine power Pelim obtained from the upper-limit engine power setting map of FIG. 8 is set as the upper-limit engine power Pelim. When the upper-limit engine power Pelim is set in this way, an upper-limit driving force Tdlim is set by dividing the upper-limit engine power Pelim by the rotation speed Nd of the drive shaft 36 (Step S160). Here, the upper-limit driving force Tdlim is a driving force when the upper-limit engine power Pelim is output to the drive shaft 36. As the rotation speed Nd of the drive shaft 36, a rotation speed obtained by multiplying the rotation speed Nm2 of the motor MG2 by the conversion factor km or a rotation speed obtained by multiplying the vehicle speed V by a conversion factor kv can be used as described above.

The accelerator required driving force Tda and the upper-limit driving force Tdlim are compared (Step S180). When the accelerator required driving force Tda is equal to or less than the upper-limit driving force Tdlim, the accelerator required driving force Tda is set as the effective driving force Td* (Step S190) and a value obtained by subtracting the charging/discharging required power Pb* from a value which is obtained by multiplying the accelerator required driving force Tda by the rotation speed Nd of the drive shaft 36 is set as the target engine power Pe* (Step S200), similarly to the normal driving mode. Accordingly, the target engine power Pe* can be said to be power for outputting the accelerator required driving force Tda to the drive shaft 36.

On the other hand, when the accelerator required driving force Tda is greater than the upper-limit driving force Tdlim in Step S180, the upper-limit driving force Tdlim is set as the effective driving force Td* (Step S210) and a value obtained by subtracting the charging/discharging required power Pb* from the upper-limit engine power Pelim is set as the target engine power Pe* (Step S220). Since the upper-limit engine power Pelim is set by adding the charging/discharging required power Pb* to the temporary upper-limit engine power Pelim obtained from the upper-limit engine power setting map illustrated in FIG. 8 in Step S150, setting a value obtained by subtracting the charging/discharging required power Pb* from the upper-limit engine power Pelim as the target engine power Pe* refers to setting the temporary upper-limit engine power Pelim obtained from the upper-limit engine power setting map illustrated in FIG. 8 as the target engine power Pe*. In this way, by considering the charging/discharging required power Pb*, the operation point of the engine 22 can be maintained to be constant regardless of charging/discharging of the battery 50. Since the upper-limit driving force Tdlim is calculated by dividing the upper-limit engine power Pelim by the rotation speed Nd of the drive shaft 36 in Step S160, the upper-limit engine power Pelim can be said to be power for outputting the upper-limit driving force Tdlim to the drive shaft 36.

Then, the torque command Tm1* of the motor MG1 is set using Expression (2) (Step S230) and the torque command Tm2* of the motor MG2 is set using Expression (3) (Step S240). The target engine power Pe* and the target engine rotation speed Ne* are transmitted to the engine ECU 24, the torque commands Tm1* and Tm2* are transmitted to the motor ECU 40 (Step S250), and the routine ends.

Figure 9:
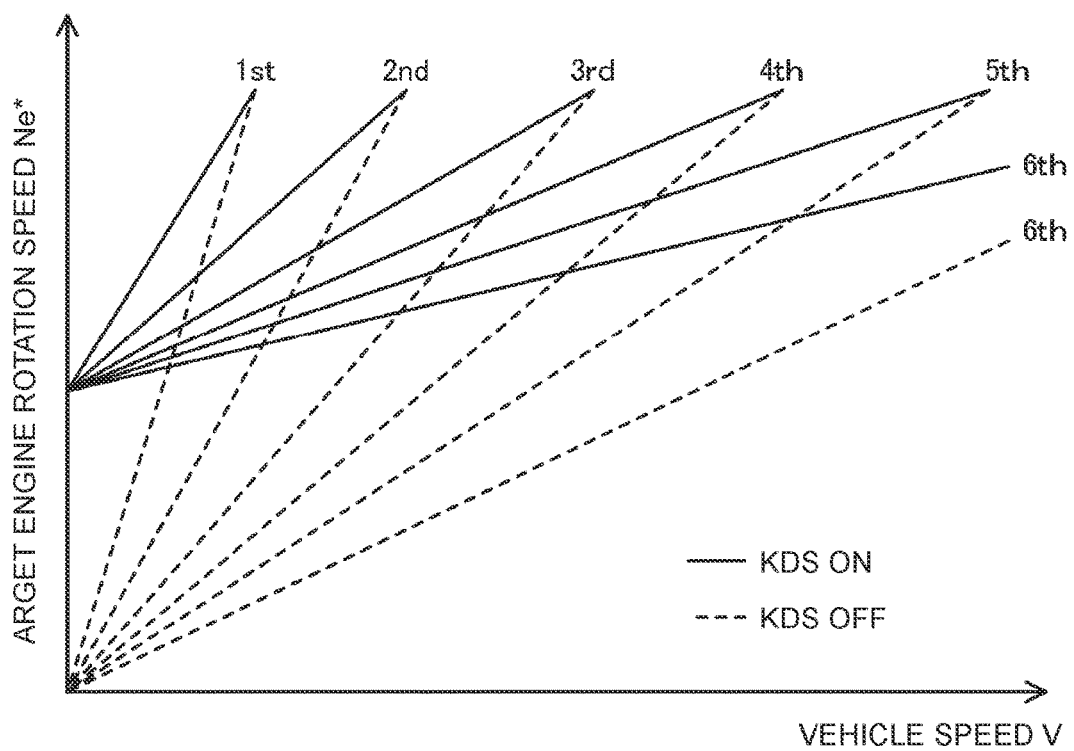
FIG. 9 is a diagram illustrating an example of a second target engine rotation speed setting map.

When it is determined in Step S130 that the kickdown switch 84a is turned on, the target engine rotation speed Ne* is set using the vehicle speed V, the gear M, and a second target engine rotation speed setting map (Step S170). FIG. 9 illustrates an example of the second target engine rotation speed setting map. In FIG. 9, the first target engine rotation speed setting map (the map when the kickdown switch 84a is turned off) is illustrated in dotted lines for the purpose of reference. As illustrated in the drawing, when the kickdown switch 84a is turned on, similarly to when the kickdown switch 84a is turned off, the target engine rotation speed Ne* is set in a linear relationship with the vehicle speed V for each gear such that a slope with respect to the vehicle speed V decreases as the gear increases. By setting the target engine rotation speed Ne* in this way (by causing the engine 22 to rotate at the target engine rotation speed Ne*), it is possible to give a driving feeling of a vehicle equipped with an automatic transmission to a driver by increasing the rotation speed Ne of the engine 22 with an increase in the vehicle speed V for each gear, or decreasing the rotation speed Ne of the engine 22 in upshifting and increasing the rotation speed Ne of the engine 22 in downshifting. As illustrated in the drawing, when the kickdown switch 84a is turned on, the target engine rotation speed Ne* is set to be higher than when the kickdown switch 84a is turned off. By setting the target engine rotation speed Ne* in this way (by causing the engine 22 to rotate at the target engine rotation speed Ne*), it is possible to give a better feeling of acceleration to the driver.

Then, the accelerator required driving force Tda is set as the effective driving force Td* (Step S190), and a value obtained by subtracting the charging/discharging required power Pb* from a value which is obtained by multiplying the accelerator required driving force Tda by the rotation speed Nd of the drive shaft 36 is set as the target engine power Pe* (Step S200). Accordingly, the target engine power Pe* can be said to be a power for outputting the accelerator required driving force Tda to the drive shaft 36. Then, the processes of Steps S230 to S250 are performed and the routine ends. When the kickdown switch 84a is turned on, the accelerator required driving force Tda is set as the effective driving force Td* and it is thus possible to output a larger driving force to the drive shaft 36 than when the kickdown switch 84a is turned off. Accordingly, it is possible to give a better feeling of acceleration to a driver.

In the above-mentioned hybrid vehicle 20 according to the first embodiment, when the D position is set in the driving feeling priority mode and the kickdown switch 84a (the kickdown signal KDS) is turned off, the target engine rotation speed Ne* is set on the basis of the vehicle speed V and the gear M, and the engine 22 and the motors MG1 and MG2 are controlled such that the smaller of the upper-limit driving force Tdlim based on the target engine rotation speed Ne* and the accelerator required driving force Tda is output to the drive shaft 36 and the engine 22 rotates at the target engine rotation speed Ne*. Accordingly, when the driver steps on the accelerator pedal 83, it is possible to set the rotation speed Ne of the engine 22 to the rotation speed (the target engine rotation speed Ne*) based on the vehicle speed V and the gear M and to prevent the driver from feeling discomfort in terms of the driving feeling in comparison with a case in which the rotation speed Ne of the engine 22 increases rapidly before the vehicle speed V increases. When the gear M is changed (shifted), it is possible to give a feeling of a change in speed to the driver. As a result, it is possible to give a better driving feeling to the driver. On the other hand, when the kickdown switch 84a is turned on, the target engine rotation speed Ne* is set to be higher than when the kickdown switch 84a is turned off on the basis of the vehicle speed V and the gear M, and the engine 22 and the motors MG1 and MG2 are controlled such that the accelerator required driving force Tda is output to the drive shaft 36 and the engine 22 rotates at the target engine rotation speed Ne*. Accordingly, similarly to when the kickdown switch 84a is turned off, it is possible to give a better driving feeling to the driver. In comparison with the case in which the kickdown switch 84a is turned off, it is possible to set the rotation speed Ne of the engine 22 (the target engine rotation speed Ne*) to be higher. Since the accelerator required driving force Tda based on the accelerator opening level Acc increases and is not limited by the upper-limit driving force Tdlim, it is possible to output a larger driving force (the effective driving force Td*) to the drive shaft 36. Accordingly, when the kickdown switch 84a is turned on, it is possible to give a better feeling of acceleration to the driver.

Figure 10:
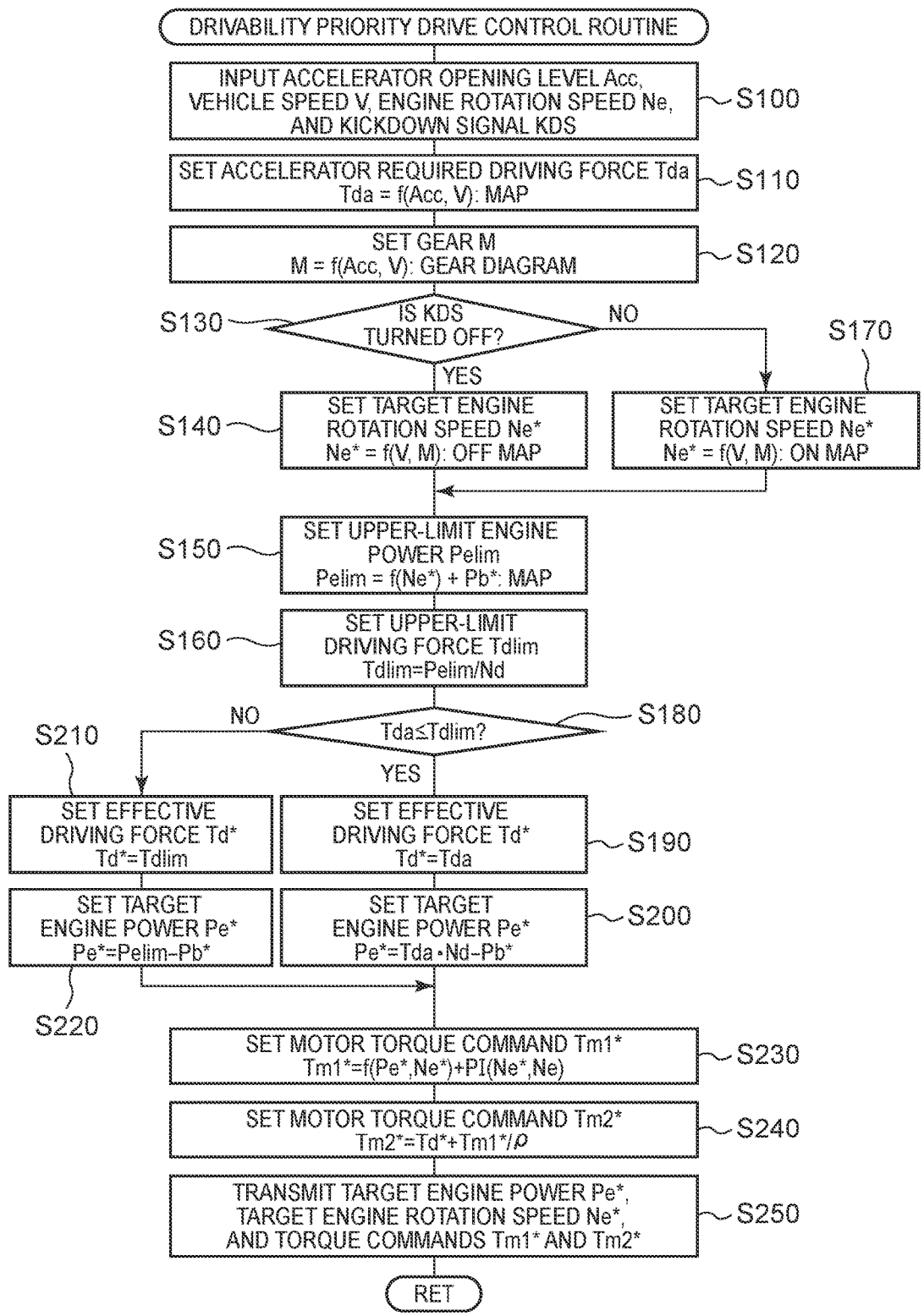
FIG. 10 is a flowchart illustrating a drivability priority drive control routine according to a modified example.

In the hybrid vehicle 20 according to the first embodiment, when the kickdown switch 84a is turned on, the upper-limit engine power Pelim and the upper-limit driving force Tdlim are not set (the processes of Steps S150 and S160 are not performed) and the accelerator required driving force Tda is set as the effective driving force Td* (Step S190). However, as illustrated in the drivability priority drive control routine of FIG. 10, when the kickdown switch 84a is turned on, similarly to when the kickdown switch 84a is turned off, the upper-limit engine power Pelim and the upper-limit driving force Tdlim may be set (Steps S150 and S160) and the smaller of the accelerator required driving force Tda and the upper-limit driving force Tdlim may be set as the effective driving force Td* (Steps S180, S190, and S210). In the drivability priority drive control routine of FIG. 10, similarly to the drivability priority drive control routine of FIG. 2, when the kickdown switch 84a is turned on, the target engine rotation speed Ne* is set to be higher than when the kickdown switch 84a is turned off using the first target engine rotation speed setting map of FIG. 7 or the second target engine rotation speed setting map of FIG. 9 (Steps S140 and S170). Accordingly, when the kickdown switch 84a is turned on, the target engine rotation speed Ne* is higher than when the kickdown switch 84a is turned off and thus the upper-limit engine power Pelim and the upper-limit driving force Tdlim are also higher. When the kickdown switch 84a is turned on, the accelerator opening level Acc is larger than when the kickdown switch 84a is turned off and thus the accelerator required driving force Tda is also larger. Accordingly, when the kickdown switch 84a is turned on, it is possible to output a larger driving force (the effective driving force Td*) to the drive shaft 36 than when the kickdown switch 84a is turned off. As a result, when the kickdown switch 84a is turned on, it is possible to give a better feeling of acceleration to the driver.

Figure 11:
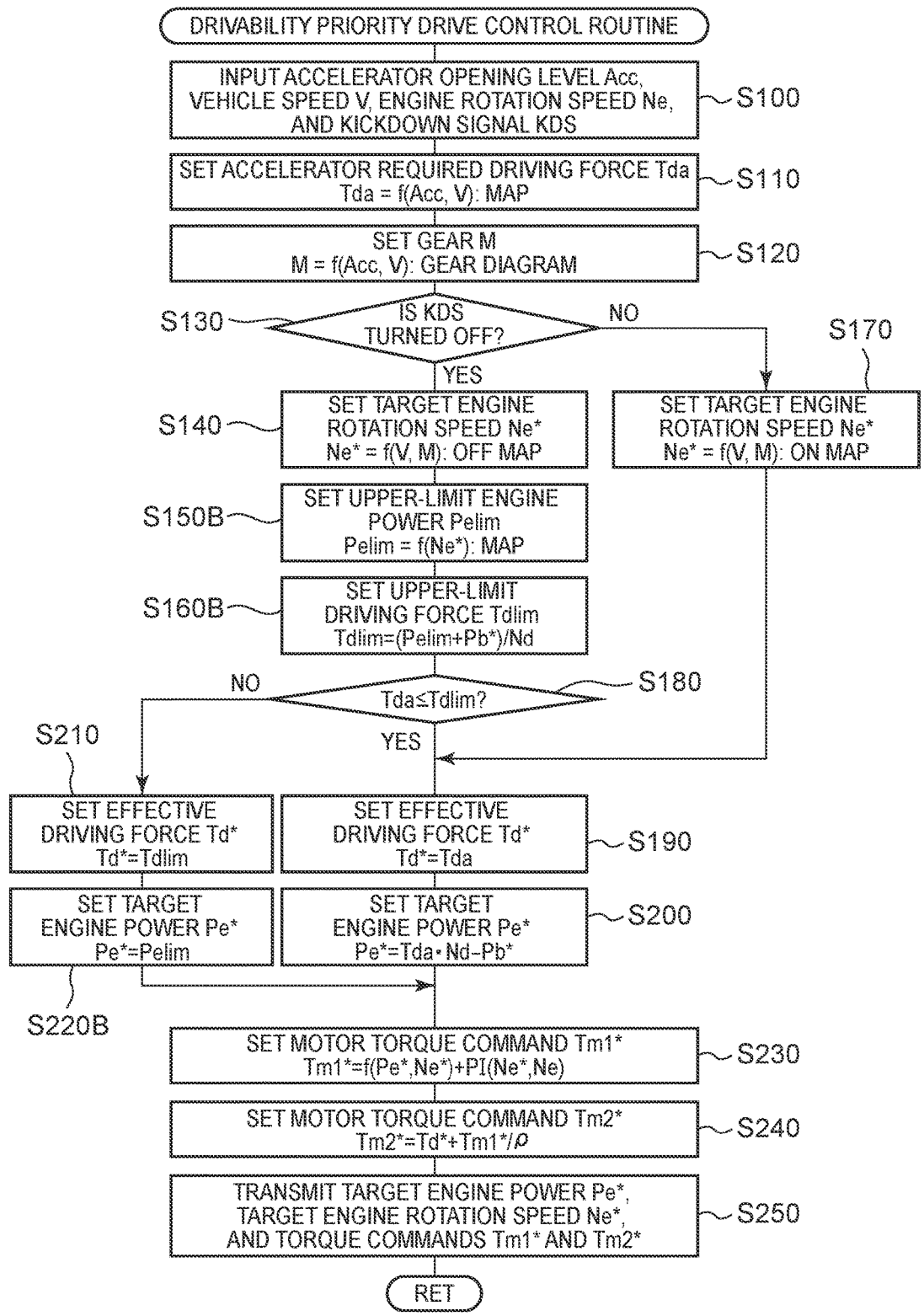
FIG. 11 is a flowchart illustrating a drivability priority drive control routine according to a modified example.

In the hybrid vehicle 20 according to the first embodiment, when the kickdown switch 84a is turned off and the accelerator required driving force Tda is greater than the upper-limit driving force Tdlim in charging/discharging the battery 50, the upper-limit engine power Pelim is set by adding the charging/discharging required power Pb* to the temporary upper-limit engine power Pelim obtained from the upper-limit engine power setting map of FIG. 8 (Step S150), and a value obtained by subtracting the charging/discharging required power Pb* from the upper-limit engine power Pelim is set as the target engine power Pe* (Step S220). However, as described in the drivability priority drive control routine illustrated in FIG. 11, the temporary upper-limit engine power Pelim obtained by the upper-limit engine power setting map of FIG. 8 may be set as the upper-limit engine power Pelim (Step S150B), the upper-limit driving force Tdlim may be set by dividing a value, which is obtained by adding the charging/discharging required power Pb* to the upper-limit engine power Pelim, by the rotation speed Nd of the drive shaft 36 (Step S160B), and the upper-limit engine power Pelim may be set as the target engine power Pe* (Step S220B). The drivability priority drive control routine of FIG. 2 and the drivability priority drive control routine of FIG. 11 are different in only whether to consider the charging/discharging required power Pb* in calculating the upper-limit engine power Pelim or whether to consider the charging/discharging required power Pb* in calculating the upper-limit driving force Tdlim, and the results thereof are identical to each other.

In the hybrid vehicle 20 according to the first embodiment, the power for outputting the smaller driving force of the accelerator required driving force Tda and the upper-limit driving force Tdlim to the drive shaft 36 is set as the target engine power Pe*. However, the target engine power Pe* may be set such that the smaller of the power obtained by multiplying the accelerator required driving force Tda by the rotation speed Nd of the drive shaft 36 (Tda×Nd) and the power obtained by multiplying the upper-limit driving force Tdlim by the rotation speed Nd of the drive shaft 36 (Tdlim×Nd) is output to the drive shaft 36. That is, the process of Step S180 can be set to a process of comparing the power obtained by multiplying the accelerator required driving force Tda by the rotation speed Nd of the drive shaft 36 (Tda×Nd) with the power obtained by multiplying the upper-limit driving force Tdlim by the rotation speed Nd of the drive shaft 36 (Tdlim×Nd).

In the hybrid vehicle 20 according to the first embodiment, the mode switch 90 is provided and the drivability priority drive control routine illustrated in FIG. 2 is performed when the driving feeling priority mode is selected by the mode switch 90, but the drivability priority drive control routine illustrated in FIG. 2 may be performed as normal drive control without providing the mode switch 90.

Figure 12:
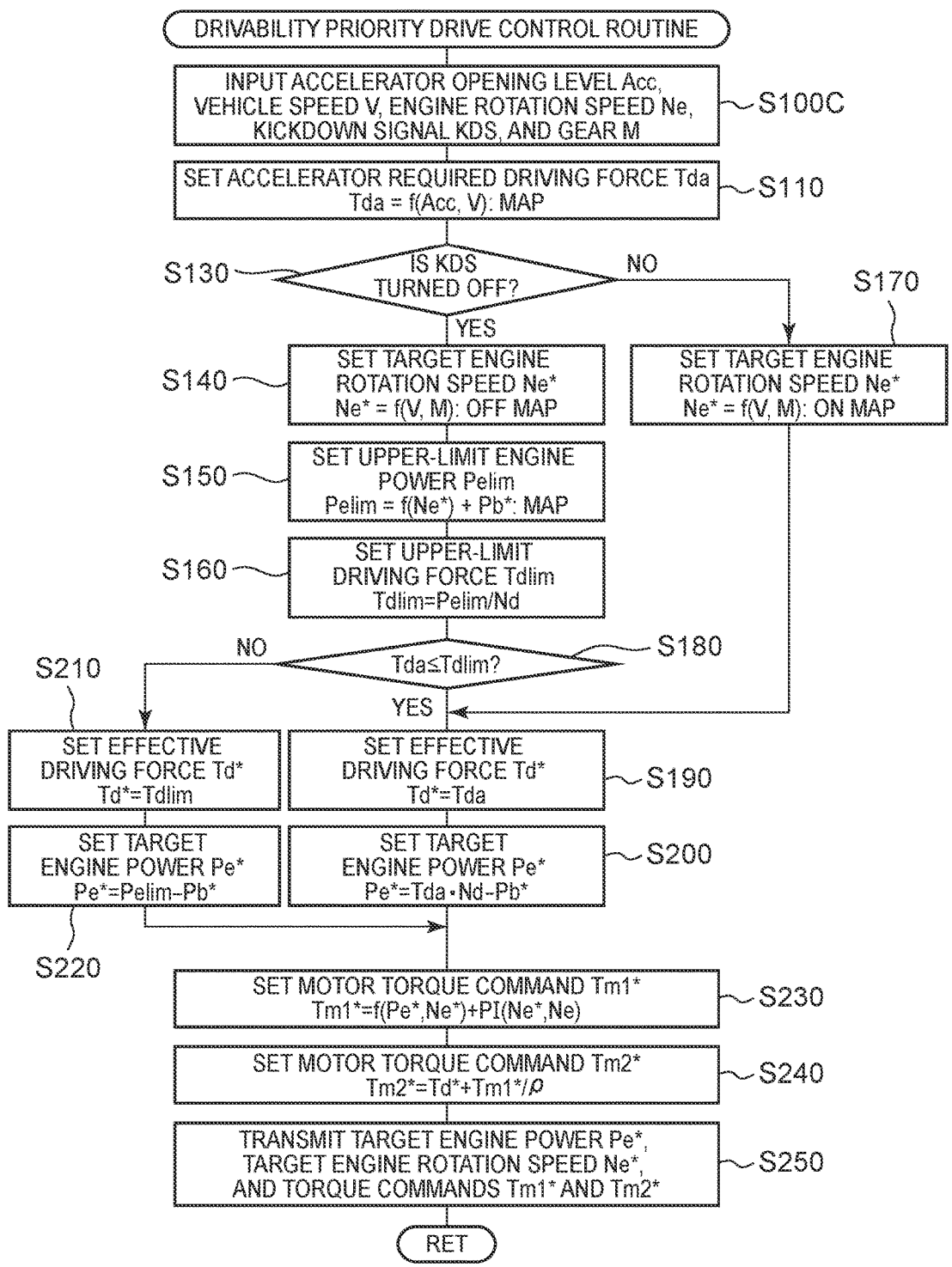
FIG. 12 is a flowchart illustrating an example of the drivability priority drive control routine which is performed by the HVECU when an M position is set.

An operation when the shift position SP is the manual position (M position) in the hybrid vehicle 20 according to the first embodiment will be described below. In this case, the drivability priority drive control routine illustrated in FIG. 12 can be performed. The drivability priority drive control routine illustrated in FIG. 12 is the same as the drivability priority drive control routine illustrated in FIG. 2, except that the process of Step S100C of inputting the gear M as the shift position SP in addition to the accelerator opening level Acc, the kickdown signal KDS, the vehicle speed V, and the rotation speed Ne of the engine 22 is added and the process of Step S120 of setting the gear M using the gear diagram illustrated in FIG. 6 is excluded. The drive control when the shift position SP is the M position will be described below in brief using the drivability priority drive control routine illustrated in FIG. 12.

Figure 3:
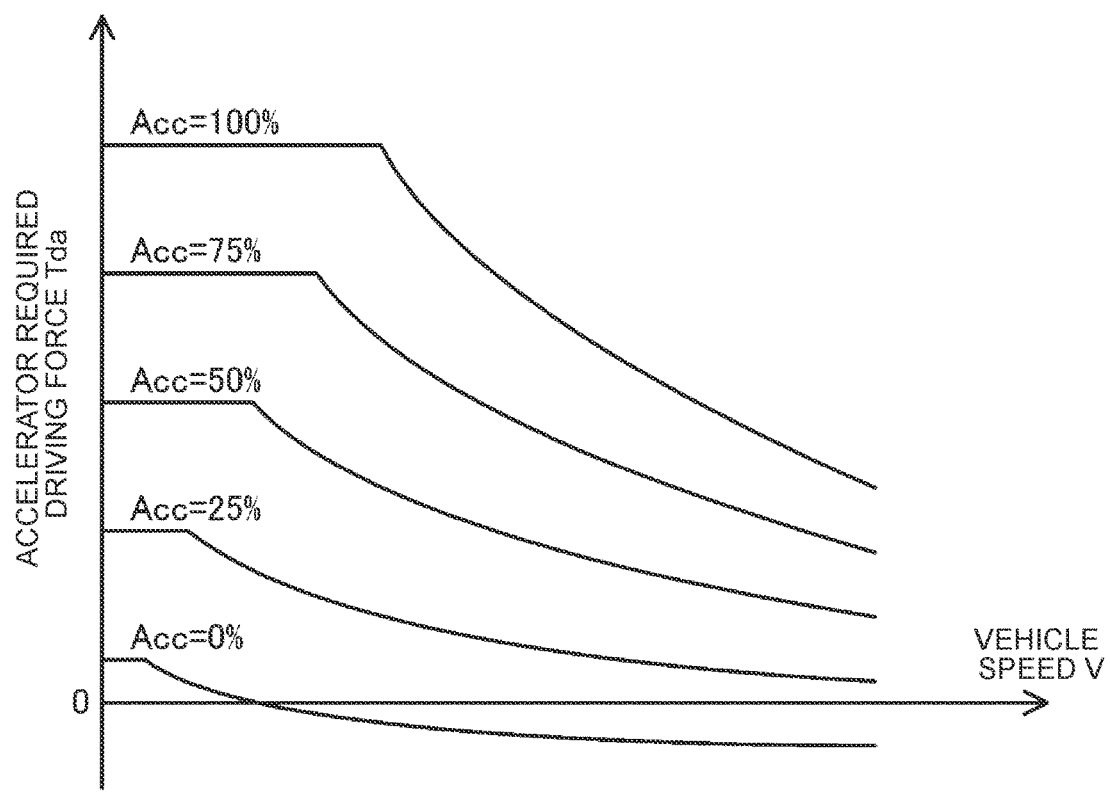
FIG. 3 is a diagram illustrating an example of an accelerator required driving force setting map.

When the drivability priority drive control routine illustrated in FIG. 12 is performed, the HVECU 70 first receives the accelerator opening level Acc, the kickdown signal KDS, the vehicle speed V, the rotation speed Ne of the engine 22, and the gear M (Step S100C), and sets the accelerator required driving force Tda using the received accelerator opening level Acc, the received vehicle speed V, and the accelerator required driving force setting map illustrated in FIG. 3 (Step S110). Subsequently, it is determined whether the kickdown switch 84a is turned on using the kickdown signal KDS (Step S130). When the kickdown switch 84a is turned off, the target engine rotation speed Ne* is set using the vehicle speed V, the gear M, and the first target engine rotation speed setting map illustrated in FIG. 7 (Step S140). Then, the upper-limit engine power Pelim is set by adding the charging/discharging required power Pb* to the temporary upper-limit engine power Pelim which is obtained using the target engine rotation speed Ne* and the upper-limit engine power setting map illustrated in FIG. 8 (Step S150). The upper-limit driving force Tdlim is set by dividing the upper-limit engine power Pelim by the rotation speed Nd of the drive shaft 36 (Step S160), and the accelerator required driving force Tda is compared with the upper-limit driving force Tdlim (Step S180).

When the accelerator required driving force Tda is equal to or less than the upper-limit driving force Tdlim, the accelerator required driving force Tda is set as the effective driving force Td* (Step S190), and a value obtained by subtracting the charging/discharging required power Pb* from a value which is obtained by multiplying the accelerator required driving force Tda by the rotation speed Nd of the drive shaft 36 is set as the target engine power Pe* (Step S200). When the accelerator required driving force Tda is greater than the upper-limit driving force Tdlim, the upper-limit driving force Tdlim is set as the effective driving force Td* (Step 5210) and a value obtained by subtracting the charging/discharging required power Pb* from the upper-limit engine power Pelim is set as the target engine power Pe* (Step S220).

Then, the torque command Tm1* of the motor MG1 is set using Expression (2) (Step 5230) and the torque command Tm2* of the motor MG2 is set using Expression (3) (Step S240). The target engine power Pe* and the target engine rotation speed Ne* are transmitted to the engine ECU 24, the torque commands Tm1* and Tm2* are transmitted to the motor ECU 40 (Step S230), and the routine ends.

When it is determined in Step S130 that the kickdown switch 84a is turned on, the target engine rotation speed Ne* is set using the vehicle speed V, the gear M, and the second target engine rotation speed setting map of FIG. 9 (Step S170). Subsequently, the accelerator required driving force Tda is set as the effective driving force Td* (Step S190), and a value obtained by subtracting the charging/discharging required power Pb* from a value which is obtained by multiplying the accelerator required driving force Tda by the rotation speed Nd of the drive shaft 36 is set as the target engine power Pe* (Step S200). Then, the processes of Steps S230 to S250 are performed and the routine ends.

In the hybrid vehicle 20 according to the first embodiment, when the shift position SP is the M position, the same control as when the D position is set in the driving feeling priority mode is performed. That is, when the kickdown switch 84a is turned off, the target engine rotation speed Ne* is set on the basis of the vehicle speed V and the gear M, and the engine 22 and the motors MG1 and MG2 are controlled such that the smaller driving force of the upper-limit driving force Tdlim based on the target engine rotation speed Ne* and the accelerator required driving force Tda is output to the drive shaft 36 and the engine 22 rotates at the target engine rotation speed Ne*. On the other hand, when the kickdown switch 84a is turned on, the target engine rotation speed Ne* is set to be higher than when the kickdown switch 84a is turned off on the basis of the vehicle speed V and the gear M, and the engine 22 and the motors MG1 and MG2 are controlled such that the accelerator required driving force Tda is output to the drive shaft 36 and the engine 22 rotates at the target engine rotation speed Ne*. Accordingly, it is possible to give a better driving feeling to a driver. When the kickdown switch 84a is turned on, it is possible to give a better feeling of acceleration to the driver.

Figure 13:
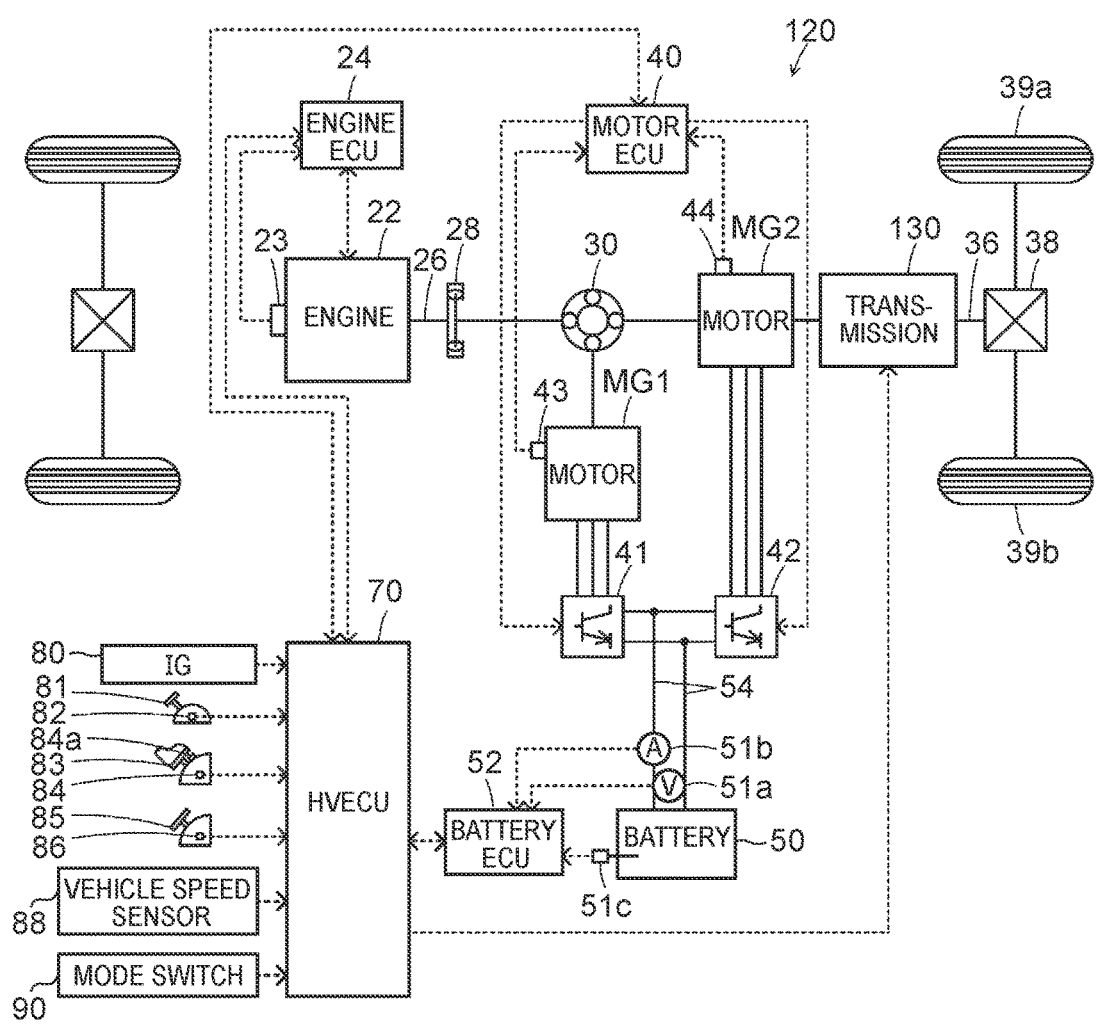
FIG. 13 is a diagram schematically illustrating a configuration of a hybrid vehicle according to a second embodiment.

A hybrid vehicle 120 according to a second embodiment of the disclosure will be described below. The configuration of the hybrid vehicle 120 according to the second embodiment is schematically illustrated in FIG. 13. The hybrid vehicle 120 according to the second embodiment has the same configuration as the hybrid vehicle 20 according to the first embodiment illustrated in FIG. 1, except that a transmission 130 is provided as illustrated in FIG. 13. For the purpose of omission of repeated description, the same elements in the hybrid vehicle 120 according to the second embodiment as in the hybrid vehicle 20 according to the first embodiment will be referenced by the same reference signs and detailed description thereof will not be made.

Figure 14:
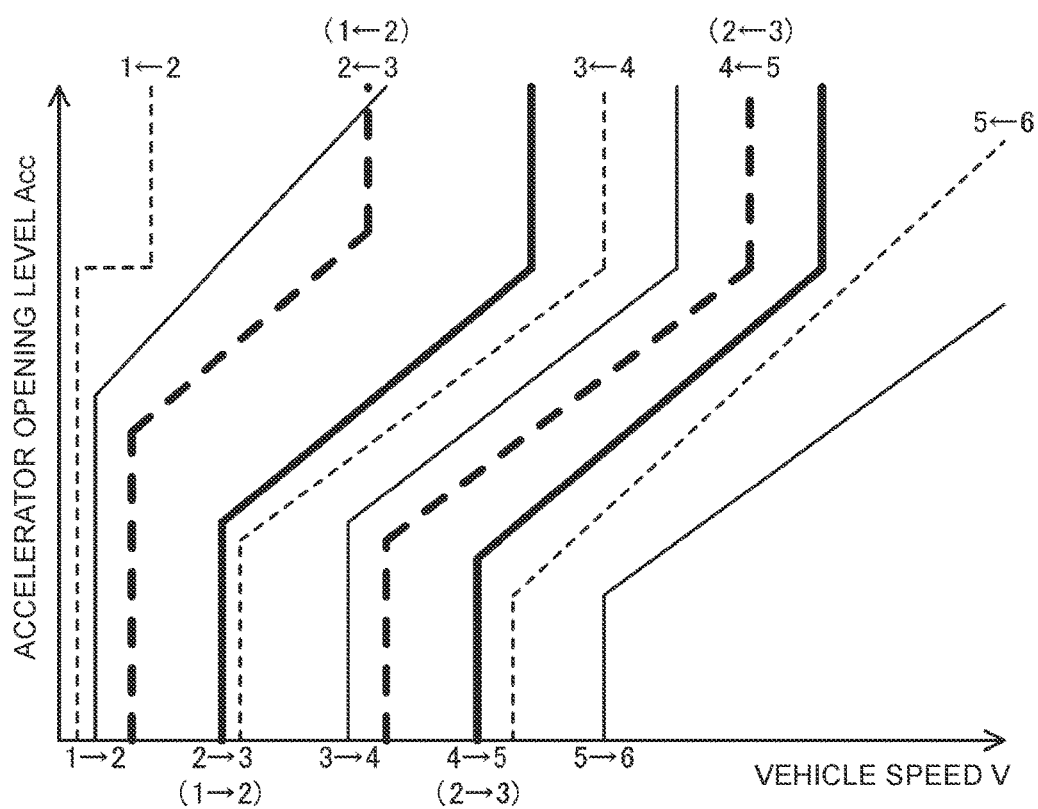
FIG. 14 is a diagram illustrating an example of a gear diagram which is used in the second embodiment.

The transmission 130 included in the hybrid vehicle 120 according to the second embodiment includes a plurality of engagement elements, is constituted by a stepped automatic transmission of three gears in the driving direction which is hydraulically driven, and is shifted in accordance with a control signal from the HVECU 70. The plurality of engagement elements of the transmission 130 each include a hydraulic servo constituted by a piston, a frictional engagement plate, an oil chamber, and the like. In the hybrid vehicle 120 according to the second embodiment, three virtual gears are set in addition to three gears of the transmission 130 to constitute a transmission of six gears. FIG. 14 illustrates an example of a gear diagram which is used in the second embodiment. For the purpose of easy comparison, the gear diagram illustrated in FIG. 14 is the same as the gear diagram illustrated in FIG. 6. In FIG. 14, thick solid lines denote upshift lines of the transmission 130 and thick dotted lines denote downshift lines of the transmission 130. Thin solid lines denote virtual upshift lines and thin dotted lines denote virtual downshift lines. In the drawing, numerals and arrows in the upper part and the lower part denote shift of six gears including the virtual gears, and numerals and arrows in parentheses in the upper part and the lower part denote shift of three gears of the transmission 130. As illustrated in the drawing, one virtual gear is disposed between neighboring gears of the transmission 130.

In the hybrid vehicle 120 according to the second embodiment, when the shift position is the D position in the driving feeling priority mode, the drivability priority drive control routine illustrated in FIG. 15 is performed. The drivability priority drive control routine illustrated in FIG. 15 is the same as the drivability priority drive control routine illustrated in FIG. 2, except for Steps S100D, S120D, S240D, and S250D are performed instead of Steps S100, S120, S240, and S250 and the process of Step S165D is added. Accordingly, the same processes in the drivability priority drive control routine illustrated in FIG. 15 as in the drivability priority drive control routine illustrated in FIG. 2 are referenced by the same step numbers. The drivability priority drive control routine illustrated in FIG. 15 will be described below in brief with a focus on differences from the drivability priority drive control routine illustrated in FIG. 2.

When the drivability priority drive control routine illustrated in FIG. 15 is performed, the HVECU 70 first receives a gear control flag Fsc in addition to the accelerator opening level Acc, the kickdown signal KDS, the vehicle speed V, and the rotation speed Ne of the engine 22 (Step SIND). Here, the gear control flag Fsc is a flag which is set to 0 when the gear control of the transmission 130 is not performed and is set to 1 when the gear control of the transmission 130 is performed.

Subsequently, the accelerator required driving force Tda is set using the accelerator opening level Acc, the vehicle speed V, and the accelerator required driving force setting map illustrated in FIG. 3 (Step S110), and the gear M and the actual gear Ma are set using the accelerator opening level Acc, the vehicle speed V, and the gear diagram illustrated in FIG. 14 (Step S120D). Here, the gear M means the six gears including the virtual gears, and the actual gear Ma means the three gears of the transmission 130. Accordingly, the gear M is set to any one of the six gears on the basis of all gear lines in FIG. 14, and the actual gear Ma is set to any one of the three gears on the basis of the thick solid line and the thick dotted line in FIG. 14.

Then, it is determined whether the kickdown switch 84a is turned on or off using the kickdown signal KDS (Step S130). When the kickdown switch 84a is turned off, the target engine rotation speed Ne* is set using the vehicle speed V, the gear M, and the first target engine rotation speed setting map of FIG. 7 (Step S140). Subsequently, the upper-limit engine power Pelim is set by adding the charging/discharging required power Pb* to the temporary upper-limit engine power Pelim which is obtained using the target engine rotation speed Ne* and the upper-limit engine power setting map illustrated in FIG. 8 (Step S150). Then, the upper-limit driving force Tdlim is set by dividing the upper-limit engine power Pelim by the rotation speed Nd of the drive shaft 36 (Step S160) and the accelerator required driving force Tda and the upper-limit driving force Tdlim are compared (Step S180).

When the accelerator required driving force Tda is equal to or less than the upper-limit driving force Tdlim, the accelerator required driving force Tda is set as the effective driving force Td* (Step S190), and a value which is obtained by subtracting the charging/discharging required power Pb* from a value obtained by multiplying the accelerator required driving force Tda by the rotation speed Nd of the drive shaft 36 is set as the target engine power Pe* (Step S200). When the accelerator required driving force Tda is greater than the upper-limit driving force Tdlim, the upper-limit driving force Tdlim is set as the effective driving force Td* (Step S210) and a value obtained by subtracting the charging/discharging required power Pb* from the upper-limit engine power Pelim is set as the target engine power Pe* (Step S220).

Then, the torque command Tm1* of the motor MG1 is set using Expression (2) (Step S230) and torque command Tm2* of the motor MG2 is set using Expression (5) (Step S240D). In Expression (5), "Gr" denotes a gear ratio of the actual gear Ma of the transmission 130. Accordingly, the first term on the right side of Expression (5) means a driving force to be output to an input shaft of the transmission 130 so as to output the effective driving force Td* to the drive shaft 36 which is an output shaft of the transmission 130.

$$Tm2^* = Td^*/Gr + Tm1^*/\rho \tag{5}$$

The target engine power Pe* and the target engine rotation speed Ne* are transmitted to the engine ECU 24, the torque commands Tm1* and Tm2* are transmitted to the motor ECU 40, the actual gear Ma is transmitted to the transmission 130 (Step S250D), and the routine ends. The transmission 130 receiving the actual gear Ma maintains the gear when the gear is an actual gear Ma, and performs the gear control such that the gear is an actual gear Ma when the gear is not an actual gear Ma.

In the gear control of the transmission 130, fast filling control, standby control, torque phase control, inertia phase control, and ending control are performed on an engagement element to be changed from a disengaged state to an engaged state to form a shifted level among the plurality of engagement elements. The fast feeling control is control of rapidly filling a gap between the piston of the target engagement element and the frictional engagement plate with a hydraulic oil. The standby control is control of keeping a hydraulic pressure of the target engagement element at the atmospheric pressure to stabilize an actual hydraulic pressure and to improve controllability thereafter. The torque phase control is control of increasing the hydraulic pressure of the target engagement element to change transmission of a torque from transmission by the non-shifted level to transmission by the shifted level. The inertia phase control is control of increasing the hydraulic pressure of the target engagement element to cause the rotation speed of the input shaft of the transmission 130 to approach the rotation speed corresponding to the shifted level (the shifted rotation speed). The ending control is control of further increasing the hydraulic pressure of the target engagement element to completely engage. In the gear control of the transmission 130, disengagement control is also performed on the engagement element to be changed from the engaged state to the disengaged state to form the shifted level among the plurality of engagement elements.

When it is determined in Step S130 that the kickdown switch 84a is turned on, the value of the gear control flag Fsc is checked (Step S165D). Then, when the gear control flag Fsc is set to 0, it is determined that the gear control of the transmission 130 is not performed, and the target engine rotation speed Ne* is set using the vehicle speed V, the gear M, and the second target engine rotation speed setting map of FIG. 9 (Step S170). Subsequently, the accelerator required driving force Tda is set as the effective driving force Td* (Step S190), and a value obtained by subtracting the charging/discharging required power Pb* from the value obtained by multiplying the accelerator required driving force Tda by the rotation speed Nd of the drive shaft 36 is set as the target engine power Pe* (Step S200). Then, the processes of Steps S230 to S250D are performed and then the routine ends.

Similarly to the first embodiment, in this routine, when the kickdown switch 84a is turned on and the gear control of the transmission 130 is not performed, the target engine rotation speed Ne* is set to be higher than when the kickdown switch 84a is turned off. When the kickdown switch 84a is turned on, the accelerator required driving force Tda is set as the effective driving force Td* and thus a larger driving force can be output to the drive shaft 36 in comparison with the case in which the kickdown switch 84a is turned off. As a result, it is possible to give a better feeling of acceleration to a driver.

When it is checked in Step S165D that the gear control flag Fsc is set to 1, it is determined that the gear control of the transmission 130 is performed, the target engine rotation speed Ne* is set using the vehicle speed V, the gear M, and the first target engine rotation speed setting map of FIG. 7 (Step S140), and the processes of Step S150 and the steps subsequent thereto are performed.

When the target engine rotation speed Ne* is switched from a rotation speed (an OFF rotation speed) obtained using the first target engine rotation speed setting map of FIG. 7 to a rotation speed (an ON rotation speed) obtained using the second target engine rotation speed setting map of FIG. 9 immediately after the kickdown switch 84*a* is turned on in the middle of the gear control of the transmission 130, shock may be generated in the middle of the gear control of the transmission 130 or a time to completion of the gear control may be extended with the rapid increase in the engine rotation speed, with a rapid increase in the rotation speed Ne of the engine 22. In the second embodiment, when the kickdown switch 84*a* is turned on in the middle of the gear control of the transmission 130, it is possible to prevent shock in the middle of the gear control of the transmission 130 or extension of the time to completion of the gear control by switching the target engine rotation speed Ne* from the OFF rotation speed to the ON rotation speed after the gear control of the transmission 130 is completed (after the gear control flag Fsc is switched to 0).

FIG. 16 is a diagram illustrating an example of a state in which the kickdown switch 84*a* is turned on in the middle of gear control of the transmission 130. In the drawing, solid lines denote the state of the second embodiment and dotted lines denote the state of a comparative example in which the engine rotation speed is changed immediately after the kickdown switch 84*a* is turned on. As illustrated in the drawing, in the embodiment and the comparative example, it is considered that the gear control of the transmission 130 starts at time t11 and the kickdown switch 84*a* is turned on at time t13 in the middle of the change of the rotation speed of the input shaft of the transmission 130 to the shifted rotation speed from time t12. In the comparative example, as indicated by the dotted lines, the engine rotation speed Ne starts increasing immediately after the kickdown switch 84*a* is turned on. Accordingly, the time until the rotation speed of the input shaft of the transmission 130 reaches the shifted rotation speed is relatively long. On the other hand, in the embodiment, even when the kickdown switch 84*a* is turned on, the engine rotation speed Ne starts increasing after the gear control of the transmission 130 is completed (after the rotation speed of the input shaft of the transmission 130 reaches the shifted rotation speed). Accordingly, it is possible to prevent extension of the time until the gear control of the transmission 130 is completed.

Since the above-mentioned hybrid vehicle 120 according to the second embodiment functions in the same way as the hybrid vehicle 20 according to the first embodiment, the same advantages as achieved in the hybrid vehicle 20 according to the first embodiment can be achieved. That is, it is possible to give a better driving feeling to a driver. When the kickdown switch 84*a* is turned on, it is possible to give a better feeling of acceleration to the driver.

In the hybrid vehicle 120 according to the second embodiment, when the kickdown switch 84*a* is turned on in the middle of the gear control of the transmission 130, the target engine rotation speed Ne* is switched from the OFF rotation speed (the rotation speed which is obtained using the first target engine rotation speed setting map of FIG. 7) to the ON rotation speed (the rotation speed which is obtained using the second target engine rotation speed setting map of FIG. 9) after the gear control of the transmission 130 is completed. Accordingly, it is possible to prevent shock in the middle of the gear control of the transmission 130 or extension of the time to completion of the gear control.

In the hybrid vehicle 120 according to the second embodiment, when the kickdown switch 84*a* is turned on in the middle of the gear control of the transmission 130, the target engine rotation speed Ne* is switched from the OFF rotation speed to the ON rotation speed after the gear control of the transmission 130 is completed. However, when the kickdown switch 84*a* is turned on before the inertia phase control is started in the middle of the gear control of the transmission 130, the target engine rotation speed Ne* may be switched from the OFF rotation speed to the ON rotation speed at the start time of the inertia phase control. According to this configuration, it is possible to prevent shock in the middle of the gear control or extension of the time to completion of the gear control in comparison with the case in which the target engine rotation speed Ne* is switched from the OFF rotation speed to the ON rotation speed immediately after the kickdown switch 84*a* is turned on. In comparison with the case in which the target engine rotation speed Ne* is switched from the OFF rotation speed to the ON rotation speed after the gear control is completed, it is possible to switch the target engine rotation speed Ne* at an earlier timing. By experiment or the like of the inventors, it was seen that extension of the time to completion of the gear control can be prevented by switching the target engine rotation speed Ne* when the inertia phase control is started.

FIG. 17 is a diagram illustrating an example of a state in which the kickdown switch 84*a* is turned on before the inertia phase control is started in the middle of gear control of the transmission 130. In the drawing, solid lines denote the state of the modified example and dotted lines denote the state of a comparative example in which the engine rotation speed is changed immediately after the kickdown switch 84*a* is turned on. As illustrated in the drawing, in the modified example and the comparative example, it is considered that the gear control of the transmission 130 starts at time t21 and the kickdown switch 84*a* is turned on at time t22 until the inertia phase control is started from time t23. In the comparative example, as indicated by the dotted lines, the engine rotation speed Ne starts increasing immediately after the kickdown switch 84*a* is turned on. Accordingly, the time until the rotation speed of the input shaft of the transmission 130 reaches the shifted rotation speed is relatively long. On the other hand, in the embodiment, even when the kickdown switch 84*a* is turned on, the engine rotation speed Ne starts increasing at the start time of the inertia phase control. Accordingly, it is possible to prevent extension of the time until the gear control of the transmission 130 is completed.

In the hybrid vehicle 120 according to the second embodiment, when the kickdown switch 84*a* is turned on in the middle of the gear control of the transmission 130, the target engine rotation speed Ne* is switched from the OFF rotation speed to the ON rotation speed after the gear control of the transmission 130 is completed. However, when the kickdown switch 84*a* is turned on, the target engine rotation speed Ne* may be immediately switched from the OFF rotation speed to the ON rotation speed regardless of whether the gear control of the transmission 130 is performed.

Figure 18:
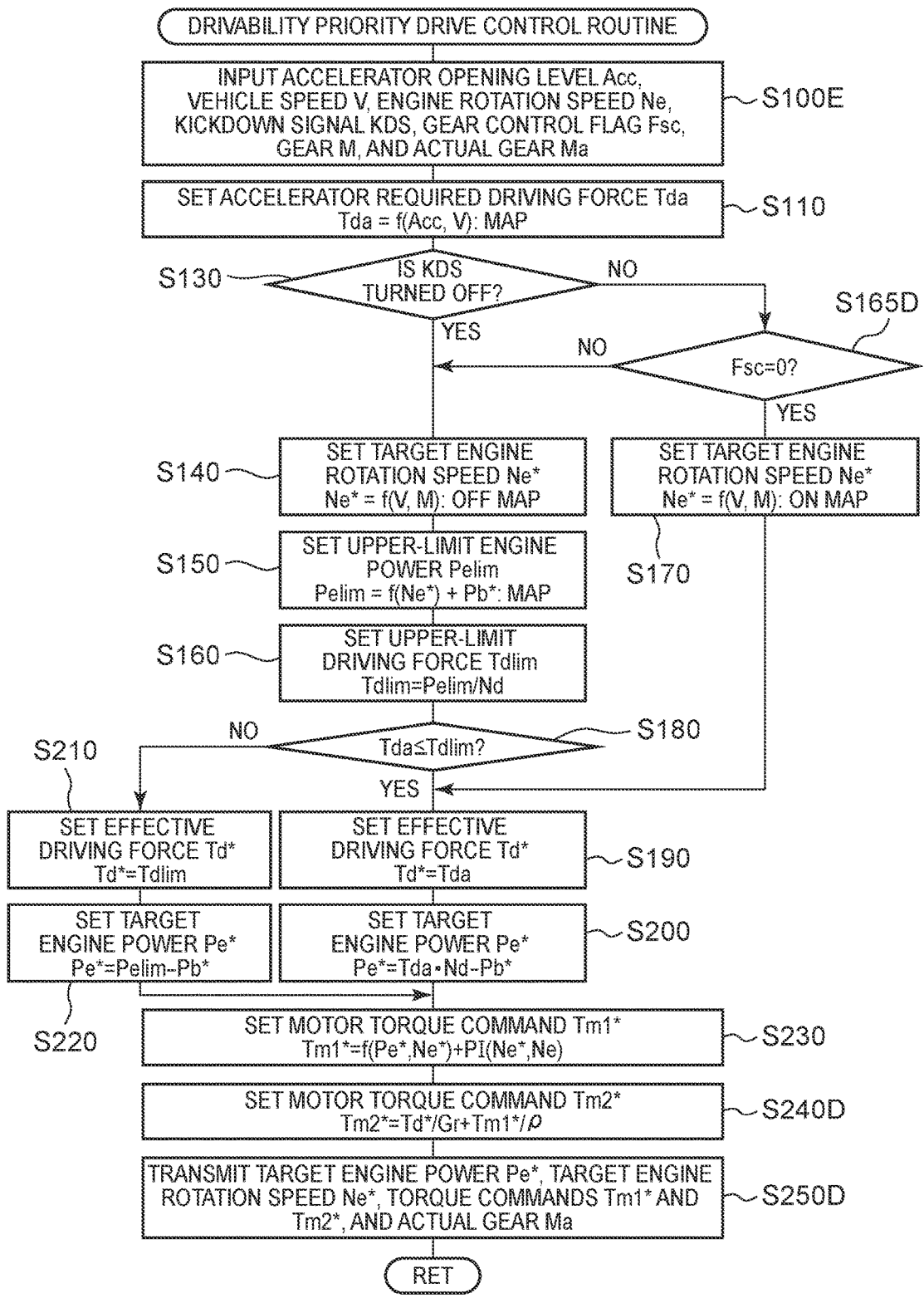
FIG. 18 is a flowchart illustrating an example of the drivability priority drive control routine which is performed by the HVECU when an M position is set in the second embodiment.

An operation when the shift position SP is the M position in the hybrid vehicle 120 according to the second embodiment will be described below. In this case, the drivability priority drive control routine illustrated in FIG. 18 can be performed. The drivability priority drive control routine illustrated in FIG. 18 is the same as the drivability priority drive control routine illustrated in FIG. 15, except that Step S100E of inputting the gear M and the actual gear Ma as the shift position SP in addition to the accelerator opening level Acc, the kickdown signal KDS, the vehicle speed V, the rotation speed Ne of the engine 22, and the gear control flag Fsc is performed and the process of Step S120D of setting the gear M and the actual gear Ma using the gear diagram illustrated in FIG. 14 is excluded. As the actual gear Ma, a value which is set on the basis of the gear M to satisfy the relationship between the gear M and the actual gear Ma in the gear diagram illustrated in FIG. 14 can be input. By performing the drivability priority drive control routine illustrated in FIG. 18 when the shift position SP is the M position, it is possible to achieve the same advantages as when the D position is set in the driving feeling in the second embodiment.

In the hybrid vehicle 120 according to the second embodiment, the transmission 130 of three gears is provided to constitute six gears including the virtual gears, but the transmission 130 is not limited to the three gears and may have two gears or may have four or more gears. One virtual gear is disposed between neighboring gears of the transmission, but a desired number of virtual gears such as one gear or second gears may be disposed in each gear of the transmission or a desired number of virtual gears may be disposed in only a specific gear of the transmission. The virtual gears may not be provided.

Correspondences between principal elements in the embodiments and principal elements of the disclosure described in "SUMMARY" will be described below. In the embodiments, the engine 22 corresponds to the "engine," the motor MG1 corresponds to the "first motor," the drive shaft 36 corresponds to the "drive shaft," the planetary gear 30 corresponds to the "planetary gear mechanism," the motor MG2 corresponds to the "second motor," and the battery 50 corresponds to the "battery." The kickdown switch 84a corresponds to the "kickdown switch" and the HVECU 70, the engine ECU 24, and the motor ECU 40 that perform drive control in the normal driving mode or the drivability priority drive control routine illustrated in FIG. 2 correspond to the "electronic control unit."

The correspondences between principal elements in the embodiments and principal elements of the disclosure described in "SUMMARY" do not limit the elements of the disclosure described in the "SUMMARY," because the embodiments are an example for specifically describing the aspects for putting the disclosure described in the "SUMMARY" into practice. That is, analysis of the disclosure described in the "SUMMARY" has to be performed on the basis of description thereof, and the embodiments are only a specific example of the disclosure described in the "SUMMARY."

While aspects of the disclosure have been described above with reference to the embodiments, but the disclosure is not limited to the embodiments and can be modified in various forms without departing from the gist of the disclosure.

The disclosure is applicable to the industry of manufacturing a hybrid vehicle.

What is claimed is:

1. A hybrid vehicle comprising:
an engine;
a first motor;
a planetary gear mechanism, three rotary elements of the planetary gear mechanism connected to an output shaft of the engine, a rotary shaft of the first motor, and a drive shaft connected to an axle, respectively;
a second motor configured to output a power to the drive shaft, and the second motor configured to receive a power from the drive shaft;
a battery configured to exchange electric power with the first motor and the second motor;
an electronic control unit configured to set a required driving force to be output to the drive shaft based on an amount of accelerator operation by a driver and a vehicle speed, and the electronic control unit configured to control the engine, the first motor, and the second motor such that the hybrid vehicle travels using a driving force based on the required driving force; and
a kickdown switch configured to be turned on when the amount of the accelerator operation is equal to or larger than a predetermined value, and the kickdown switch configured to be turned off when the amount of the accelerator operation is smaller than the predetermined value,
the electronic control unit being configured to
i) when the kickdown switch is turned off,
set a target rotation speed of the engine based on the vehicle speed and a shift gear, and
control the engine, the first motor, and the second motor such that the smaller driving force of an upper-limit driving force and the required driving force is output to the drive shaft and the engine rotates at the target rotation speed,
the upper-limit driving force being a driving force when the engine operates at the target rotation speed and an upper-limit power output from the engine is output to the drive shaft, and
ii) when the kickdown switch is turned on,
set the target rotation speed of the engine to be higher than when the kickdown switch is turned off based on the vehicle speed and the shift gear and,
control the engine, the first motor, and the second motor such that the required driving force is output to the drive shaft or the smaller driving force of the upper-limit driving force and the required driving force is output to the drive shaft, and the engine rotates at the target rotation speed.

2. The hybrid vehicle according to claim 1, wherein the electronic control unit is configured to set the shift gear based on the amount of the accelerator operation and the vehicle speed or based on a driver's shifting operation.

3. The hybrid vehicle according to claim 1, wherein the shift gear is a virtual gear.

4. The hybrid vehicle according to claim 1, further comprising a stepped transmission attached between the drive shaft and the planetary gear mechanism,
wherein the shift gear is a gear of the stepped transmission or a gear obtained by adding a virtual gear to the gear of the stepped transmission.

5. The hybrid vehicle according to claim 4, wherein the electronic control unit is configured to switch the target rotation speed from an OFF rotation speed when the kickdown switch is turned off to an ON rotation speed when the kickdown switch is turned on after gear control is completed in a case where the kickdown switch is turned on while the gear control of the stepped transmission is being performed.

6. The hybrid vehicle according to claim 5, wherein the electronic control unit is configured to switch the target rotation speed from the OFF rotation speed to the ON rotation speed at a start time of inertia phase control to change a rotation speed of an input shaft of the stepped transmission to a rotation speed corresponding to a changed gear in a case where the kickdown switch is turned on before the inertia phase control is started in the gear control of the stepped transmission.

* * * * *

UNITED STATES PATENT AND TRADEMARK OFFICE
CERTIFICATE OF CORRECTION

PATENT NO. : 10,046,755 B2
APPLICATION NO. : 15/583151
DATED : August 14, 2018
INVENTOR(S) : Shunya Kato and Masaya Sugai It is certified that error appears in the above-identified patent and that said Letters Patent is hereby corrected as shown below:

In Column 15, Line 34, delete "Step 5210" and insert --Step S210--, therefor.

In Column 15, Line 39, delete "Step 5230" and insert --Step S230--, therefor.

In Column 17, Line 5, delete "Step SIND" and insert --S100D--, therefor.

Signed and Sealed this
Second Day of October, 2018

Andrei Iancu
*Director of the United States Patent and Trademark Office*